United States Patent
Lin et al.

(10) Patent No.: US 8,361,623 B2
(45) Date of Patent: Jan. 29, 2013

(54) SEQUESTRATION OF COMPOUNDS FROM MICROORGANISMS

(75) Inventors: Victor Shang-Yi Lin, Ames, IA (US); Brian G. Trewyn, Ames, IA (US); Po-Wen Chung, Ames, IA (US); Igor Ivan Slowing, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 425 days.

(21) Appl. No.: 12/698,656

(22) Filed: Feb. 2, 2010

(65) Prior Publication Data

US 2010/0196971 A1 Aug. 5, 2010

Related U.S. Application Data

(60) Provisional application No. 61/149,221, filed on Feb. 2, 2009.

(51) Int. Cl.
| | | |
|---|---|---|
| B32B 19/04 | (2006.01) | |
| C01B 33/12 | (2006.01) | |
| C12P 7/64 | (2006.01) | |

(52) U.S. Cl. .................... 428/405; 423/335; 435/134
(58) Field of Classification Search ............... 428/405; 423/335; 435/134
See application file for complete search history.

(56) References Cited

U.S. PATENT DOCUMENTS

| | | |
|---|---|---|
| 2006/0018966 A1 | 1/2006 | Lin et al. |
| 2006/0154069 A1 | 7/2006 | Lin et al. |
| 2008/0021232 A1 | 1/2008 | Lin et al. |
| 2008/0175783 A1 | 7/2008 | Park et al. |

FOREIGN PATENT DOCUMENTS

| | | |
|---|---|---|
| JP | 2006069824 A | 3/2006 |
| WO | WO-01/32308 A1 | 5/2001 |
| WO | WO-2004/054708 A2 | 7/2004 |
| WO | WO-2008/060571 A2 | 5/2008 |
| WO | WO-2009/017425 A1 | 2/2009 |
| WO | WO-2010088001 A2 | 8/2010 |
| WO | WO-2010088001 A3 | 12/2010 |

OTHER PUBLICATIONS

"International Application Serial No. PCT/US2010/000289, International Preliminary Report on Patentability mailed Aug. 11, 2011", 20 pgs.

Capasso, J. M., et al., "A colorimetric assay for determination of cell viability in algal cultures", *Biomolecular Engineering*, 20(Issues 4-6), (2003), 133-138.

Cazin, C. S. J., et al., "Versatile Methods for the Synthesis of Si(OR)₃-Functionalised Imidazolium Salts, Potential Precursors for Heterogeneous NHC Catalysts and Composite Materials", *Synthesis 2005*, No. 4, (2005), 622-626.

Cha, S., et al., "Colloidal Graphite-Assisted Laser Desorption/Ionization Mass Spectrometry and MSn of Small Molecules. 1. Imaging of Cerebrosides Directly from Rat Brain Tissue", *Analytical Chemistry*, 79(6), (2007), 2373-2385.

Chisti, Y., "Biodiesel from microalgae", *Biotechnology Advances*, 25, (2007), 294-306.

(Continued)

*Primary Examiner* — Rosanne Kosson
(74) *Attorney, Agent, or Firm* — Schwegman Lundberg & Woessner, P.A.

(57) ABSTRACT

The invention provides novel mesoporous particles and methods for the selective sequestration of organic compounds from microorganisms, such as from various genera and species of algae that produce important organic compounds. The organic compounds can be selectively sequestered, for example, in favor of biodiesel impurities such as sterols and chlorophyll, to provide substantially pure free fatty acids. The free fatty acids can then be esterified to provide pure biodiesel.

19 Claims, 18 Drawing Sheets

OTHER PUBLICATIONS

Dayananda, C., et al., "Autotrophic cultivation of *Botryococcus braunii* for the production of hydrocarbons and exopolysaccharides in various media", *Biomass & Bioenergy*, 31, (2007), 87-93.

Herrero, M. A., et al., "Recent Advances in the Covalent Functionalization of Carbon Nanotubes", *Mol. Cryst. Liq. Cryst.*, 483, (2008), 21-32.

Hirsch, A., et al., "Functionalization of Carbon Nanotubes", *Topics in Current Chemistry—Functional Molecular Nanostructures*, vol. 245, (2007), 193-237.

Leon-Banares, R., et al., "Transgenic microalgae as green cell-factories", *TRENDS in Biotechnology*, 22(1), (2004), 45-52.

Nepal, D., et al., "Chapter 4—Functionalization of Carbon Nanotubes", *Functional Nanomaterials*, Geckeler, K. E., et al., Editors, American Scientific Publishers, (2006), 57.

Pan, C., et al., "Carbon Nanotubes as Adsorbent of Solid-Phase Extraction and Matrix for Laser Desorption/Ionization Mass Spectrometry", *J. Am. Soc. Mass Spectrom.*, 16, (2005), 263-270.

Pan, C., et al., "Using Oxidized Carbon Nanotubes as Matrix for Analysis of Small Molecules by MALDI-TOF MS", *J. Am. Soc. Mass Spectrom.*, 16, (2005), 883-892.

Zhang, H., et al., "Colloidal Graphite-Assisted Laser Desorption/Ionization MS and MSn of Small Molecules. 2. Direct Profiling and MS Imaging of Small Metabolites from Fruits", *Analytical Chemistry*, 79(17), (2007), 6575-6584.

Zhila, N. O., et al., "Effect of Nitrogen Limitation on the Growth and Lipid Composition of the Green Alga *Botryococcus braunii* Kutz IPPAS H-252", *Russian Journal of Plant Physiology*, vol. 52(3), (2005), 311-319.

"International Application Serial No. PCT/US2010/000289, Search Report mailed Sep. 14, 2010", 12 pgs.

"International Application Serial No. PCT/US2010/000289, Search Report mailed Oct. 22, 2010", 12 pgs.

"International Application Serial No. PCT/US2010/000289, Written Opinion mailed Sep. 14, 2010", 18 pgs.

"International Application Serial No. PCT/US2010/000289, Written Opinion mailed Oct. 22, 2010", 18 pgs.

Hall, S. R., et al., "Template-directed synthesis of bi-functionalized organo-MCM-41 and phenyl-MCM-48 silica mesophases", *Chem. Commun.*, (1999), 201-202.

MacQuarrie, D. J, "Organically modified hexagonal mesoporous silicas—Clean of high loading and non-catalytic second groups on catalytic activity of amine-derivatised materials", Green Chemistry, vol. 1, No. 4, DDOI: 10.1039/a904692e, (Sep. 6, 1999), 195-198.

Soeng, H., "Controlling the Selectivity of Competitive Nitroaldol Condensation by Using Bifunctionalized Mesoporous silica Nanosphere-Based Catalytic System", Journal of the American Chemical Society, vol. 126, No. 4, (Sep. 1, 2004), 1010-1011.

"International Application Serial No. PCT/US2010/000289, Invitation to Pay Additional Fees and Partial International Search Report mailed Jun. 21, 2010", 13 pgs.

Gadenne, B., et al., "Supported ionic liquids ordered mesoporous silicas containing covalently linked ionic species", *Chemical Communications*, 15, (2004), 1768-1769.

Kim, T.-W., et al., "Structurally Ordered Mesoporous Carbon Nanoparticles as Transmembrane Delivery Vehicle in Human Cancer Cells", *Nano Letters*, 8(11), (2008), 3724-3727.

Udayakumar, S., et al., "Imidazolium derivatives functionalized MCM-41 for catalytic conversion of carbon dioxide to cyclic carbonate", *Catalysis Communications*, 10(5), (2009), 659-664.

Van Meter, D. S., et al., "Characterization of surface-confined ionic liquid stationary phases: impact of cation and anion identity on retention", *Analytical and Bioannalytical Chemistry* 393(1), (2008), 283-294.

SEQUESTRATION OF COMPOUNDS FROM MICROORGANISMS

RELATED APPLICATIONS

This application claims priority under 35 U.S.C. §119(e) to U.S. Provisional Patent Application No. 61/149,221, filed Feb. 2, 2009, which is incorporated herein by reference.

BACKGROUND OF THE INVENTION

Unpredictable petroleum prices and the increasing desire for energy independence and security have led to burgeoning research activities directed toward developing a variety of alternative fuels. Among these new fuels, biodiesel (including Fatty Acid Methyl Esters; FAME) is a biodegradable, non-toxic diesel that can be produced from various oil feedstocks, including vegetable oils, animal fats, algal oils, and restaurant waste oils. Examples of biodiesel include soy diesel (methyl soyate), rapeseed methyl ester, and various vegetable and animal fat methyl esters. These fatty acid methyl esters (FAME) have been accepted worldwide as viable alternatives to traditional petroleum-derived solvents and fuels. Petroleum-derived solvents and fuels are of environmental concern and are under legislative pressure to be replaced by biodegradable substitutes that afford reduced environmental impact. Although interest in biodiesel is rapidly increasing, the general process by which it is synthesized has not changed in recent years.

Accordingly, there is a need for new methods for obtaining fuels and fuel precursors from readily available organic materials, including microorganisms. There is also a need for methods that can provide fuels and fuel precursors in an environmentally friendly manner, such as by methods that do not destroy the source from which the fuels and fuel precursors are obtained.

SUMMARY

The invention provides new compositions and methods for the efficient and selective extraction of organic compounds from microorganisms. In one embodiment, the method includes the selective extraction of fats and fatty acids from microalgae. The extractions can be carried out to provide a mixture of isolated high value compounds, such as free fatty acids, wherein the mixture is free or substantially free of contaminants that are not suitable for fuel applications, such as sterols, chlorophylls, and/or other pigments in the extracts. The methods employ mesoporous solid particles to harvest organic compounds from microorganisms, such as various strains of algae. The organic compounds can include oils, fats, and/or fatty acids. In some embodiments, for example, when using a particular class of mesoporous particles, the extraction can be selective for one kind of organic compound over another, or over a range of others. Selective sequestration can be measured and determined, for example, by GC-MS or MALDI-MS.

The invention, therefore, also provides a series of mesoporous materials that can be used for selective extraction of high value compounds, such as fatty acids and esters, from algae cultures. The mesoporous materials can be used in a biphasic organic/aqueous solution that allows for the removal of the compounds from the algae by the selective sequestration of the compounds in the pores of the mesoporous particles. The removal and sequestration can be performed without disrupting, drying, or killing algae cells, thereby allowing for further culturing and reuse.

The invention thus provides an inexpensive, clean method to extract the large amounts of fatty acids and oils produced by algae. Once extracted, these fatty acids and fats can be converted to biofuels and biodiesel, for example, by esterification reactions. Such fuels can be used to supplement the world's increasing need for renewable energy sources.

The mesoporous materials described herein allow for the sequestration of algal oils in an efficient, environmentally clean, and inexpensive manner, compared to known methods. The compositions and techniques described herein are more environmentally friendly than currently used methods because the mesoporous materials can sequester valuable oils without killing the algae that produce them, allowing for continued oil production by the algae. By using a biphasic solution, fatty acids and oils produced by algae can be obtained from inside the algal cells and selectively sequestered in the porous frameworks of the mesoporous materials. These fatty acids and oils can then be removed from the mesopores by simple washing, and can be isolated by concentrating the extract. They can then be readily converted to high value products by means already established in the industry, such as various transesterification procedures. See, for example, *Biotechnology Advances*, 25 (2007) 294-306.

The invention therefore provides a mesoporous particle that includes an ordered porous silicon oxide matrix with hexagonal symmetry, and dialkyl imidazolium groups covalently bonded to the outside surface through a silicon-carbon bond, wherein the particle is about 75 nm to about 125 nm in diameter. The invention also provides a mesoporous particle that includes an ordered porous silicon oxide matrix with hexagonal symmetry, ($C_{10}$-$C_{20}$)alkyl groups covalently bonded to the outside surface of the mesoporous particle, and amino-($C_1$-$C_{12}$)alkyl groups covalently bonded to the inner surfaces of pores of the mesoporous particle. The alkyl chain of the amino-($C_1$-$C_{12}$)alkyl can be a continuous straight chain or can be optionally interrupted by one or more, e.g., one or two —NH— groups. The particles can include two or more different average pore size distributions of about 3 nm to about 15 nm, for example, about 3 nm to about 5 nm, or about 13 nm to about 15 nm. The invention further provides a mesoporous particle that includes an ordered tetragonal mesoporous carbon matrix with a plurality of pores, wherein the particle is spheroid (e.g., substantially spherical), and has a diameter of about 50 nm to about 250 nm. The surface area can be about 800 $m^2$/g to about 2200 $m^2$/g, and the pores can have average diameters of about 2 nm to about 3 nm in certain embodiments.

The invention additionally provides methods that include extracting organic compounds from a microorganism. The extraction can be a selective extraction where certain organic compounds are extracted and others are not, and/or certain organic compounds are extracted in a higher relative ratio that other organic compounds. The organic compounds can include triglycerides, fatty acids, alkyl esters, or a combination thereof.

Steps of the method can include contacting a microorganism with a hydrophobic organic solvent to form a first mixture. The contacting can be carried out in the presence of a medium that includes water, for example, a culture medium for growing the microorganism. The first mixture can then be contacted with a plurality of mesoporous particles described above, and/or a plurality of non-functionalized mesoporous silica particles, to form a second mixture in which the mesoporous particles sequester the organic compounds from the microorganism. The mesoporous particles can then be isolated from the second mixture and the organic compounds can be removed from the mesoporous particles to provide a group of selectively extracted organic compounds.

In some embodiments, contacting the mesoporous particles and the first mixture can be carried out by agitation procedures, such as stirring, shaking, or vortexing. Suitable extraction by shaking can be carried in about 1 to about 10 minutes (e.g., about 5 minutes), or optionally longer. Alternatively, suitable extraction can be carried out by vortexing for about 10 seconds to about 120 seconds (e.g., about 20, 30, 45, or 60 seconds).

The contacting can be carried out in a biphasic mixture such as an emulsion. The pH of the emulsion can be controlled by the addition of a buffer, or by including a buffer or other pH adjusting agent in the medium that includes water.

The methods can also include removing the organic compounds from the mesoporous particles by washing the mesoporous particles with a suitable organic solvent, such as a $(C_1-C_4)$alcohol, for example, methanol. The method can also optionally include evaporating the organic solvent to provide the isolated compounds. The group of selectively extracted organic compounds can be substantially free of contaminants such as chlorophyll and/or sterols, which are commonly found in extracts obtained by known methods. Alternatively, free fatty acids sequestered by the mesoporous particles can be directly esterified to biodiesel by adding an acid, such as HCl, in the presence of a $(C_1-C_4)$alcohol, such as methanol.

In certain embodiments, the selective extraction can provide selectivity for one or more extracted compounds over others. For example, the selective extraction can provide a higher wt. % of methyl stearate than methyl palmitate. In other embodiments, the selective extraction can provide a higher wt. % of methyl palmitate than methyl stearate.

A suitable microorganism for the extraction is algae. The extraction can be carried out on any genera of algae that produce extractable compounds such as oils, fatty acids, and alkyl esters. For example, wild-type natural genera, such as *Botryococcus*, *Chlorella*, and *Neochloris*, are suitable for the aforementioned extraction process. Genetically modified algae with high-fat producing capability are also suitable genera for this extraction method.

Any hydrophobic organic solvent that dissolves the organic compounds produced by the microorganism, and that is substantially immiscible in water, can be used in the extraction methods. In certain embodiments, the solvent or solvent system (e.g., a combination of solvents) includes hexane. Once the first mixture is contacted with the hydrophobic organic solvent and the mesoporous particles, the resulting mixture can optionally be heated prior to isolating the mesoporous particles from the second mixture, for example, by incubation for 10-60 minutes, or about 30 minutes.

A significant advantage of the methods described herein is that the extraction procedure does not kill the microorganisms from which the compounds are extracted. Loss of microorganism cells in this process is mainly due to mechanical loss on a laboratory scale. Thus the invention provides a non-lethal method for extracting organic compounds from microorganisms, which is an advance from known technology that kills the microorganisms, for example, by crushing and/or otherwise killing the cells during the extraction process.

Additionally, the invention provides a matrix for mass spectrometry analysis that includes mesoporous particles described herein, such as those isolated from the second mixture of the extraction process. The invention therefore provides novel mesoporous particles, intermediates for their synthesis, as well as methods of preparing the particles and using the particles, for example, in mass spectrometry.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention, however, one skilled in the art will understand that portions of the example or aspect may be used in combination with other examples or aspects of the invention.

FIG. 16).

FIG. 16).

DETAILED DESCRIPTION

Figure 1:
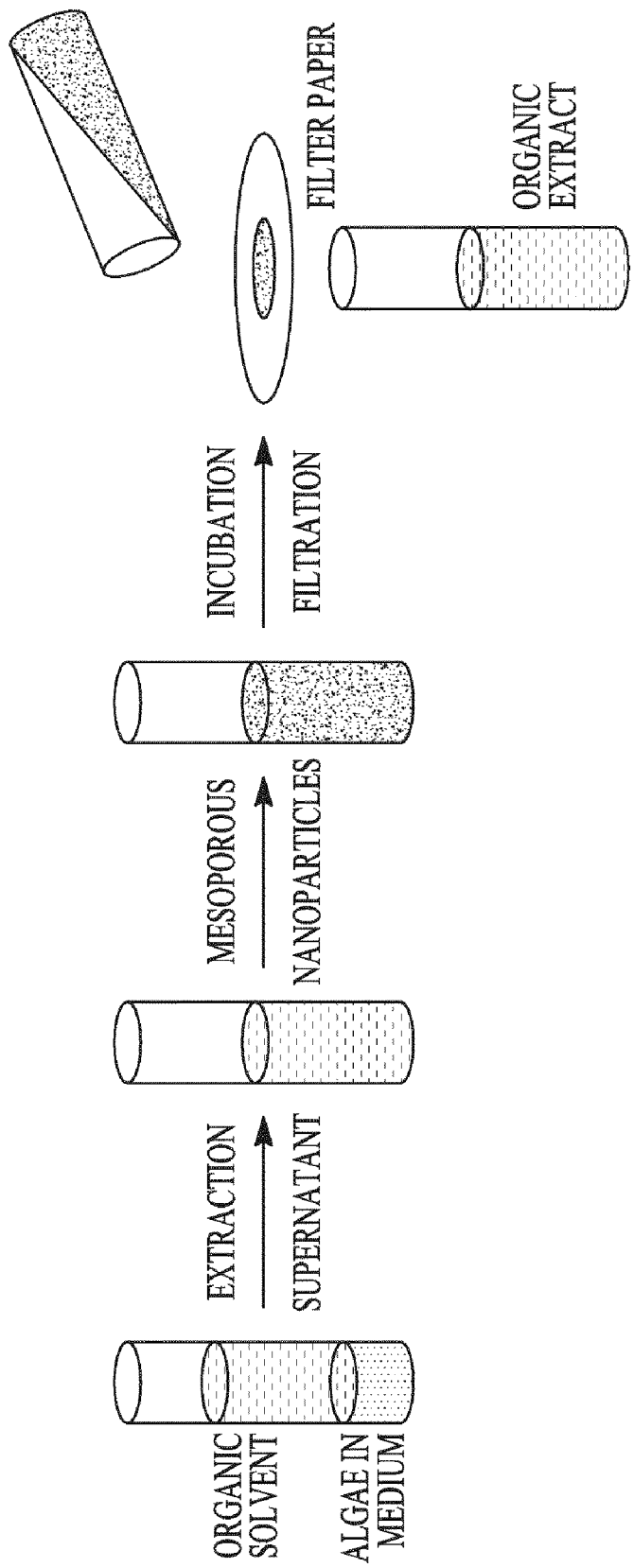
FIG. 1 illustrates a process for non-lethal extraction of microalgal oils from microalgae, according to an embodiment of the invention.

Known methods of fatty acid extraction from algae are typically lethal to algae cells. The methods described herein are not lethal to algae, thus fatty acid production by the algae can be continued by reculturing the cells. The expense of conventional extraction methods, partially due to the lethal nature of the methods used, has hampered development of the extracted compounds as viable feedstocks.

Conventional extraction methods of removing algal oils from algae cultures typically require drying, grinding, and resuspensing biomass in nonpolar organic solvents, thus ending the algae cell life. The methods described herein therefore provide significant advantages over known methods by allowing for reduced expense and increased efficiency in algal oil sequestration. In addition, it is believed that the selective sequestration of the algae-produced fatty acids and oils has not been previously known. The mesoporous materials described herein can selectively sequester high value fatty acids and oils in their mesopores, and release the materials from their pores under appropriately changed conditions, thus providing a method for selective extraction of high value compounds.

Accordingly, a nanoparticle-based technology to selectively extract free fatty acids (FFAs) in a non-lethal manner from various microorganisms is described herein. Given the considerable interest in both government and private sectors in using non-food source feedstocks to produce sustainable biorenewable fuels, this technology will be able to substantially impact the energy and chemical industries. As described in the following sections, a series of new mesoporous nanoparticle materials has been manufactured to selectively adsorb free fatty acids from microalgae. This approach reduces the cost and energy consumption in the industrial capturing of microalgal oils so that it can become a competitive method in view of volatile oil prices and food source-based biodiesel production methods.

The use of microalgae as a feedstock for biodiesel production is highly desirable because these organisms are able to produce higher yields of oil than more complex and larger organisms (e.g., traditional oil crops) in a short time and in a small space. However, the potential for employing microalgae derived oil as a source for biodiesel is also currently limited by the cost and technical complexity associated with the cultivation of the microalgae, the extraction and refining of the oil, and its conversion into biodiesel. Even if the extraction can be performed in a variety of ways, to the best of our knowledge, all of the conventional methods, such as dry-pressing, and organic solvent or critical $CO_2$ extractions, lead to complex mixtures of lipids, which, even if individually useful, are of little use as mixtures.

Mixtures of compounds extracted from microalgae using known methods often include long and/or branched chain hydrocarbons, sterols, phospholipids, triglycerides and terpenes. Such mixtures require multiple separation processes to yield biodiesel. In the case of hexane extracted soybean oil, for example, the soluble impurities are typically removed by a series of processes including degumming, alkali refining, and bleaching. After separation from other soluble substances, the extracted fatty acids and their corresponding esters need to be converted to biodiesel.

The primary source of oil for biodiesel, until recently, has been vegetable oils, such as those extracted from soybeans. The current processes for conversion of vegetable oil into biodiesel involve a series of steps, which typically include an initial saponification of triglycerides in a basic solution of the highly corrosive and toxic sodium methoxide, and an esterification occurring in acidified methanol in a homogeneously catalyzed method. One major problem with homogeneously catalyzed processes is the complexity and high energy demanding removal of byproducts and reacted catalyst, which cannot be recycled.

The methods described herein solve many of these problems by providing methods for selectively extracting FFAs from microorganisms. The extraction process is non-lethal to the microorganisms, thus they can be recultured for further extraction. Also, the mesoporous materials used for sequestration can be recycled and used in further processes. The isolated compounds can then be cleanly converted into biodiesel using processes well known in the art, or by processes described in U.S. Publication No. 2008/0021232 (Lin et al.).

Also, one of the major drawbacks of known extraction processes for extracting oils from microorganisms involves the purification of the oils, e.g., the removal of contaminants such as pigments. The process described herein can provide a pure group of compounds that does not require further purification to remove contaminants such as sterols and various lipophilic pigments, such as carotenoids, xanthophylls, and chlorophyll.

DEFINITIONS

As used herein, certain terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

The term "and/or" means any one of the items, any combination of the items, or all of the items with which this term is associated.

The singular forms "a," "an," and "the" include plural reference unless the context clearly dictates otherwise. Thus, for example, a reference to "a compound" includes a plurality of such compounds, so that a compound X includes a plurality of compounds X.

The term "about" can refer to a variation of ±5%, 10%, or 20% of the value specified. For example, "about 50" percent can in some embodiments carry a variation from 45 to 55 percent. For integer ranges, the term "about" can include one or two integers greater than and less than a recited integer.

The term "contacting" refers to the act of touching, making contact, or of bringing to immediate or close proximity, including at the molecular level, for example, to bring about a chemical reaction or physical change.

The term "algae" refers to the paraphyletic group of simple, typically autotrophic, photosynthetic organisms, ranging from unicellular (e.g., green algae) to multicellular forms. Some algae strains can produce significantly higher amounts of hydrocarbons and lipids than other strains. See for example, the algae strains recited in Table A.

TABLE A

Suitable Algae Strains and their Recoverable Oil Content.*

| Microalga | Oil content (% dry wt) |
|---|---|
| *Botryococcus braunii* | 25-75 |
| *Chlorella* sp. | 28-32 |
| *Crypthecodinium cohnii* | 20 |
| *Cylindrotheca* sp. | 16-37 |
| *Dunaliella primolecta* | 23 |
| *Isochrysis* sp. | 25-33 |
| *Monallanthus salina* | >20 |
| *Nannochloris* sp. | 20-35 |
| *Nannochloropsis* sp. | 31-68 |
| *Neochloris oleoabundans* | 35-54 |
| *Nitzschia* sp. | 45-47 |
| *Phaeodactylum tricornutum* | 20-30 |
| *Schizochytrium* sp. | 50-77 |
| *Tetraselmis sueica* | 15-23 |

*Y. Chisti, Biotechnol. Adv. 2007, 25, 294-306, which is incorporated herein by reference.

Suitable algae genera also include *Botryococcus, Chlorella*, and *Neochloris*, as well as *Dunaliella, Nannochloropsis*, and *Spirulina*. Specific species include, but are not limited to *Chlorella vulgaris, Chlorella emorsonii, Chlorella minutissima, Chlorella sorokiniana, Chlorella vulgaris, Dunaliella Bardawil, Dunaliella salina, Dunaliella primolecta, Spirulina platensis, Cyclotella cryptica, Tetraselmis suecica, Monoraphidium, Botryococcus braunii, Stichococcus, Haematococcus pluvialis, Phaeodactylum tricornutum, Tetraselmis suecica, Isochrysis galbana, Nannochloropsis, Nitzschia closterium, Phaeodactylum tricornutum, Chlamydomas perigranulata, Synechocystis, Tagetes erecta*, or *Tagetes patula*.

Any algae that produces or accumulate lipids, fatty acids, and/or fats may be used in the methods described herein. Algae that have high dry weight percent of oil content are especially useful in the methods of the invention. For example, oils can be extracted from algae that can be wild-type or genetically modified algae. The oil content of the algae can be, for example, about 15 dry wt. % to about 90 dry wt. %, about 15 dry wt. % to about 77 dry wt. %, about 30 dry wt. % to about 75 dry wt. %, or about 50 dry wt. % to about 90 dry wt. %. Certain algae can be cultured or genetically modified so that the amount of oil produced is increased. See for example, Zhila et al., *Russ. J. Plant Phys.* 2005, 52(3), 311. Various strains of algae, including genetically modified algae, can be obtained from the Culture Collection of Algae at the University of Texas at Austin (www.utex.org). Genetically modified algae, e.g., transgenic microalgae, are well known in the art. See, for example, Leon-Banares et al., *Trends in Biotechnology*, 22 (2004) 45-52.

The term "microalgae" refers to microscopic algae, typically found in freshwater and marine systems, often referred to as microphytes.

The term "fatty acid" refers to a carboxylic acid with a long typically unbranched aliphatic tail, which can be either saturated or unsaturated. Fatty acids, as used herein, are typically ($C_{10}$-$C_{20}$)carboxylic acids. The term "fat" typically refers to a triester of glycerol and fatty acids, but can also include a diester or monoester (e.g., glycerol esterified with one, two, or three ($C_{10}$-$C_{20}$)carboxylic acids).

Fatty acids can vary in carbon chain length and in the number of unsaturated bonds. Vegetable oils are typically made of a combination of fatty acids. Common vegetable oils include canola, coconut, corn, cottonseed, crambe, palm, peanut, rapeseed, soybean, and sunflower oils. These oils can contain varying amounts of fatty acids, including combinations of $C_{16}$-$C_{24}$ fatty acids, typically with 0, 1, 2, or 3 sites of unsaturation in the carbon chain. Examples of fatty acids include lauric, myristic, palmitic, palmitoleic, stearic, oleic, linoleic, and linolenic acids.

The term "polar lipid" refers to any fat-soluble (lipophilic), naturally-occurring molecule, such as fats, oils, waxes, cholesterol, sterols, fat-soluble vitamins (such as vitamins A, D, E and K), for example tocopherol and its isomers and derivatives, monoglycerides, diglycerides, triglycerides, phospholipids, terpenes, and the like. In some embodiments, the particles of the invention are selective for one type of the aforementioned polar lipids over one or more others. For example, the extractions can be free, or essentially free, of sterols.

The term "fatty acid ($C_1$-$C_4$)alkyl ester" or "($C_1$-$C_4$)alkyl fatty acid ester" refers to a fatty acid esterified with a ($C_1$-$C_4$) alkanol.

The term "$C_{10}$-$C_{24}$ fatty acid ester" refers to the ester of a $C_{10}$-$C_{24}$ fatty acid wherein the fatty acid portion of the molecule can be saturated or can have one or more sites of unsaturation, epoxidation, hydroxylation, or a combination thereof. For example, the fatty acid ester has 1, 2, 3, 4, or more sites of unsaturation, epoxidation, hydroxylation, or a combination thereof.

The term "organic solvent" refers to a carbon containing liquid that dissolves certain organic compounds. A "hydrophobic organic solvent" refers to an organic solvent that is substantially water-immiscible, as is understood by those of skill in the art. Hydrophobic organic solvents include, but are not limited to carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, or 2,2,4-trimethylpentane. Aliphatic hydrocarbons such as hexanes and petroleum ethers have been found to be especially suitable for use in the extractions described herein.

The term "($C_1$-$C_4$)alcohol" or "($C_1$-$C_4$)alkanol" refers to methanol, ethanol, propanol, iso-propanol, butanol, iso-butanol, sec-butanol, or a combination thereof.

The term "sequestering" or "sequestration" of organic compounds from microorganisms, such as algal oils from algae, refers to the process of adsorbing and/or absorbing an organic compound (e.g., an oil, such as a free fatty acid or a fatty acid ester) onto or into a particle. The adsorbing or absorbing can include binding to the surface of the particle, such as by electrostatic associations, and the like.

The term "organic pigment" refers to one or more of β-carotene, astaxanthin, zeaxanthin, a carotenoid or a chlorophyll, or another organic dye, for example, found in microorganisms.

An "aqueous medium" or "culture broth" can be any water-containing environment that can support the life cycle of microorganisms. An aqueous medium can be a gel that includes about 0.01% to about 5% dry solids and about 95% to about 99% moisture, e.g., water. An aqueous medium can also be a fermentor for microorganisms, or a natural environment for microorganisms, such as a pool or pond.

Mesoporous Particles

The invention provides several types of mesoporous particles that can be used for extraction of compounds from microorganisms. Different types of compounds, such as free fatty acids, as well as different ratios of certain compounds, can be sequestered by selecting an appropriate type of mesoporous particle.

Mesoporous silica nanoparticles (MSNs) can be prepared as described in U.S. Publication Nos. 2006/0154069 (Lin et al.), or 2006/0018966 (Lin et al.), or as described in Examples 1 and/or 3 below. Mesoporous silicates typically have hexagonally arranged mesopores and have a particle size of about 50 nm to about 1 µm. In one embodiment, the mesoporous silicates have a particle size of at least about 75 nm, 100 nm, or at least about 200 nm. In another embodiment, the mesoporous silicates have a particle size of less than about 750 nm, less than about 500 nm, or less than about 300 nm. In some embodiments, the spheroid particles are about 75-100 nm in diameter. The MSNs typically have a surface area of about 750 m$^2$/g to about 1200 m$^2$/g, or about 800 m$^2$/g to 1100 m$^2$/g, or about 900 m$^2$/g to about 1000 m$^2$/g. The average pore diameter can be about 1.5 nm to about 3.5 nm, or about 2 nm to about 3 nm for standard mesoporous particles.

As conventionally prepared, MSNs are spherical, but they can also been prepared under conditions that yield other shapes such as rods. The particles can include mesoporous silicates of any shape, provided the pore structure is suitable for absorbing and/or adsorbing oils produced by microorganisms.

Dialkylimidazolium ionic liquid MSNs have externally grafted ionic liquid moieties linked to the silicon matrix of the particle through a silicon-carbon bond. Examples of the dialkyl imidazolium species include 1-methyl-3-propyl imidazolium, but any combination of ($C_1$-$C_4$)alkyl substituted imidazolium moieties can be prepared and employed in the methods described herein. These particles have highly ordered mesostructures with 2D hexagonal symmetry, with similar structural dimensions to the nonfunctionalized MSNs described above, with an average pore diameter of about 0.2 nm less than the nonfunctionalized MSNs. In some embodiments, dialkylimidazolium ionic liquid MSNs such as PMIm-IL-MSNs can be about 75-125 nm in diameter, or about 90-110 nm in average diameter.

The bifunctional large-pore MSNs can be prepared by grafting long chain alkyl groups to the outer surfaces of as-synthesized large pore MSNs. The alkyl groups can be added by preparing a suspending the as-synthesized MSNs in a non-polar organic solvent, adding a ($C_8$-$C_{24}$)alkyltrimethoxysilane, and heating the mixture. After washing and drying, the inner pores can then be functionalized by suspending the particles in a non-polar organic solvent, adding an amino($C_1$-$C_{12}$)alkyltrialkoxysilane groups, and heating the mixture. A variety of amino($C_1$-$C_{12}$)alkyltrialkoxysilanes can be used, for example, one wherein the amino($C_1$-$C_{12}$) alkyl group is optionally interrupted by one or two —NH— groups, such as in 3-[2-(2-aminoethylamino)ethyl-amino]-propyltrimethoxysilane (AEP). Isolation, washing and drying provides an alkyl-aminoalkyl-MSN that is less hydrophobic than its precursor and can be suspended in water upon ultrasonication as a result of the terminal amino groups on the chains within the pores.

The alkyl-aminoalkyl-MSNs have similar physical dimensions to the as-synthesized MSN but have larger average pore diameters (e.g., pores of about 3 nm to about 5 nm, and other pores of about 13 nm to about 15 nm) and are more oval in shape, averaging about 200 nm to about 400 nm, or about 300 nm at longest dimension. The particles also have MCM-41 type hexagonal array of mesoporous channels.

Mesoporous carbon nanoparticles (MCNs) are especially useful to selectively adsorb short chain fatty acids, and are also useful as a matrix for MALDI-MS analysis. The MCN do not have cubic Ia-3d (MCM-48 type) mesoporous structure. After the carbon replication process, the pore structure is transformed to a tetragonal I4$_1$/a or lower mesoporous structure. The MCNs also possess surprisingly high surface areas (about 1800 m$^2$/g to about 2200 m$^2$/g) and pore volumes (about 1 cm$^3$/g to about 1.4 cm$^3$/g). Average pore diameters can be about 2 nm to about 3 nm, or about 2.2 nm to about 2.6 nm. The MCNs are typically monodisperse spherical particles of about 50-250 nm, or about 100-200 nm in average diameter, and the particle matrix is a highly ordered mesoporous structure. The MCNs do not include graphene and the MCNs are a completely different molecular structure than activated carbon or charcoal.

Non-Lethal Extraction of Microalgal Oils from Microalgae

FIG. 1 illustrates a process for non-lethal extraction of microalgal oils from microalgae, according to one embodiment of the invention. Other embodiments include variations of the scheme, according to the description herein, and as would be readily recognized by one skilled in the art.

Microorganisms in a culture can be concentrated by centrifugation prior to extraction, and a substantial portion (e.g., ~90%) of the medium can be removed. A hydrophobic organic solvent can be used for extraction of hydrocarbons and derivatives thereof from the microorganisms. During the extraction, one volume of concentrated microorganisms is thoroughly dispersed in one volume of hydrophobic organic solvent by vortexing or shaking, following by centrifugation. The hydrophobic organic solvent is then collected for analyses and the microorganisms can be washed once with one volume of the original medium, followed by reculturing in one volume of fresh medium (pH~9). Only a small percentage of the microorganisms are typically lost through the centrifugation and hydrophobic organic solvent extraction steps.

It is important to note that the different mesoporous nanoparticles described above provide various selectivities for certain oils produces by microorganisms. For example, MCNs provide a higher selectivity for methyl palmitate (C16: 1) over methyl stearate (C18:1), as well as their acid precursors. This selectivity is magnified in certain species of algae. While MCNs are about 10% more selective for methyl palmitate over methyl stearate in *Neochloris* algae, they selectively extract twice the amount of methyl palmitate compared to methyl stearate in *Chlorella* algae. This is important because the two compounds are difficult to separate. Also, longer chain biodiesel fuels become less viscous at lower temperatures and are therefore less desirable as fuels in colder climates. The use of MCNs can provide FAME biodiesel with a higher percentage of methyl palmitate, which provides a more versatile fuel for colder climate consumption.

Conversely, dialkyl imidazolium MSNs and alkyl-aminoalkyl MSNs are selective for methyl stearate over methyl palmitate. This selectivity is significant especially in view of an almost complete absence of selectivity for the amorphous silica gel. Both dialkyl imidazolium MSNs and alkyl-aminoalkyl MSNs are sequester more methyl stearate from algae than methyl palmitate. Even more surprising is the selectivity that MSNs show for methyl stearate over methyl palmitate. They sequester more than twice the amount of methyl stearate from *Neochloris* algae than methyl palmitate.

By combining the selectivity properties of the various particles, enriched fractions or pure samples of either methyl palmitate or methyl stearate can be prepared by alternately treating isolated mixtures with mesoporous particles of reversed selectivity. Such enriched or purified samples provide advantages for various operating parameters of different types of biodiesel engines in various environmental conditions.

It is also important to note that the mesoporous particles sequester FAMEs but do not sequester sterols or pigments, such as carotenoids and xanthophylls. Accordingly, the isolated fractions do not need to be further purified to remove these biodiesel contaminants. Another advantage of using the particles described herein is that the extracted compounds can also be rich in omega-3 unsaturated fatty acids, which are often used in nutraceutical products and/or as food additives.

Accordingly, the invention further provides methods to selectively sequester free fatty acids from microorganisms that produce free fatty acids. The methods can include contacting the microorganisms with a plurality of particles described herein, thereby selectively absorbing or adsorbing the free fatty acids to the pores or surface of the particles. The compounds adsorbed or absorbed by the particles are substantially all free fatty acids. For example, in one embodiment, the mass of compounds adsorbed or absorbed ("sequestered") by the particles include free fatty acids and less than 20 wt. % of compounds that are not free fatty acids. In some embodiments, the mass of compounds sequestered by the particles include free fatty acids and less than about 10 wt. % of compounds that are not free fatty acids, less than about 5 wt. % of compounds that are not free fatty acids, less than about 3 wt. % of compounds that are not free fatty acids, less than about 2.5 wt. % of compounds that are not free fatty acids, less than about 2 wt. % of compounds that are not free fatty acids, or less than about 1 wt. % of compounds that are not free fatty acids.

The method can include separating the particles and the sequestered free fatty acids from the microorganisms. The method can also include extracting free fatty acids from a mass of microorganisms with an organic solvent, adding mesoporous particles as described herein to the solution to sequester the free fatty acids, and separating the particles and sequestered free fatty acids from the organic solvent. The particles and sequestered free fatty acids can then be optionally dried and/or they can be further contacted with a ($C_1$-$C_4$) alcohol and an acid, thereby esterifying the free fatty acids to provide the corresponding ($C_1$-$C_4$)alkyl esters. Acids that can be used to esterify the FFAs are well known in the art and include mineral acids such as HCl or $H_2SO_4$.

Mass Spectrometry Methods

A series of mesoporous nanoparticle-based adsorbents have been developed that possess an ability to selectively sequester fatty acids from organic solvent extracts. The adsorbents can then release the sequestered compounds upon suspension in methanol. This series of nanomaterials include pure inorganic, and organically functionalized, mesoporous silica nanoparticles (MSN), and mesoporous carbon nanoparticles (MCN). In addition, the MCN material not only functions as a selective adsorbent of free fatty acids, but also can be used as a matrix for matrix-assisted laser desorption/ionization mass spectrometry (MALDI-MS). Incorporating a nanomaterial as both the adsorbent and matrix allows for quick analysis of the FFA adsorbed.

Current technology for use of carbon-based particle as adsorbent and as matrices for laser desorption/ionization mass spectrometry includes two types of carbon materials, i.e., carbon nanotubes and graphite. In 2005, Guo and coworkers published an investigation of employing carbon nanotubes as a solid phase adsorbent to extract small molecules (propranolol, cinchonine, and quinine) from an aqueous solution and using the carbon nanotubes with analytes as the matrix for laser desorption/ionization MS (see Pan et al., "Using Oxidized Carbon Nanotubes as Matrix for Analysis of Small Molecules by MALDI-TOF MS"; *J. Am. Soc. Mass Spectrom.* 2005, 16, (6), 883-892; and Pan et al., "Carbon nanotubes as adsorbent of solid-phase extraction and matrix for laser desorption/ionization mass spectrometry"; *J. Am. Soc. Mass Spectrom.* 2005, 16, (2), 263-270). This method did not demonstrate selectivity of organic analyte adsorption.

The methods described herein using MCNs demonstrate selective sequestration of suitable fuel feedstocks from a pool of hydrocarbons of microalgae. Several advantages of mesoporous nanomaterials over the carbon nanotube technology published by Guo include a much higher surface area and pore volume, as well as the ability to precisely control the pore size and functionalization. The specific chemical and synthetic nature of Guo carbon nanotubes limits the ease and degree of varying the particle morphology and functionalization (see Herrero and Prato, "Recent Advances in the Covalent Functionalization of Carbon Nanotubes"; *Mol. Cryst. Liq. Cryst.* 2008, 483, 21-32; Hirsch and Vostrowsky, "Functionalization of carbon nanotubes"; *Funct. Org. Mater.* 2007, 3-57; and Nepal and Geckeler, "Functionalization of carbon nanotubes"; *Funct. Nanomater.* 2006, 57-79).

The only other known example of carbon materials employed as matrices for laser desorption/ionization MS was published by Yeung and coworkers in 2007. See Cha and Yeung, "Colloidal Graphite-Assisted Laser Desorption/Ionization Mass Spectrometry and MSn of Small Molecules. 1. Imaging of Cerebrosides Directly from Rat Brain Tissue"; *Anal. Chem.* (Washington, D.C., U.S.) 2007, 79, (6), 2373-2385; and Zhang et al., "Colloidal Graphite-Assisted Laser Desorption/Ionization MS and MSn of Small Molecules. 2. Direct Profiling and MS Imaging of Small Metabolites from Fruits"; *Anal. Chem.* (Washington, D.C., U.S.) 2007, 79, (17), 6575-6584). Using graphite as an alternative matrix the researchers demonstrated advantages over conventional MALDI in the detection of small molecules with good sensitivity. Unfortunately, due to low surface area and a lack of a method of facile functionalization, graphite was not found to be an acceptable material for the selective sequestration of fuel feedstocks from the hydrocarbon pool of microalgae.

Solid extraction methods are provided in the examples below that employ a unique series of mesoporous materials. The methods are selective and the material is available for immediate analysis by MALDI-MS with the MCN and analyte (fuel feedstock) as the matrix. These methods are a significant improvement over the established carbon-based technologies used for the adsorption of organic molecules.

The sequestration of the series of mesoporous nanomaterials has been compared to amorphous silica and activated carbon, both from commercial sources. MALDI Mass Spectrometry data indicated that MCN nanoparticles can selectively sequester oleic and linoleic acids in microalgal oils. Amorphous silica lacks selectivity and activated carbon, when used as a matrix, has too low of a signal-to-noise ratio to accurately measure the selectivity of the sequestration.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

Synthesis of Mesoporous Materials

A. Synthesis of Mesoporous Silica Nanoparticles (MSN)

Cetyltrimethylammonium bromide (1.02 g, 2.66 mmol, CTAB) was dissolved in 480 mL nanopure water. Sodium hydroxide (3.5 mL, 2 M) was added to the CTAB solution. The mixture was stirred vigorously at 80° C. for 2 hours. Tetraethyl orthosilicate (5.0 mL, 21.95 mmol, TEOS) was introduced dropwise at a rate of 1 mL/minute. After the addition of TEOS, the reaction mixture was stirred vigorously at 80° C. for 2 hours. The as-synthesized MSN product was filtered and washed with copious amounts of methanol, and dried under vacuum overnight. Once dry the surfactant-template was removed by acid extraction of 2 M HCl (1 mL) in 100 mL methanol. The extraction occurred for 4 hours at 60° C.

B. Synthesis of Propylmethylimidazolium Ionic Liquid MSN (PMIm-IL-MSN)

For the grafting of ionic liquid (IL) moieties on the outside surface of MSN, 1 mmol IL-trimethoxysilane was stirred with 500 mg of as-synthesized MSN (as described above), in 80 mL of DMF at 90° C. (see Cazin et al., "Versatile methods for the synthesis of $Si(OR)_3$-functionalized imidazolium salts, potential precursors for heterogeneous NHC catalysts and composite materials"; *Synthesis* 2005, (4), 622-626). After 20 hours, the PMIm-IL-MSN was filtered and washed with successive rinses by methanol, water, and methanol. Final surfactant-free PMIm-IL-MSN was obtained following the acid wash procedure of 2 M HCl (1 mL) in 100 mL methanol at 65° C. for 4 hours.

C. Synthesis of $C_{16}$-AEP Bi-Functional Large Pore MSN ($C_{16}$-AEP-MSN)

As-synthesized large-pore MSN (48.8 mmole mesitylene added to synthesis of MSN) (1.0 g) was suspended in 100 mL of anhydrous toluene and then 2.0 mL (4.3 mmol) of hexadecyltrimethoxysilane was added to the suspension. After stirring at 100° C. for 20 hours, the product was filtered and washed with copious amounts of methanol and dried under vacuum overnight.

The resulting product was resuspended in 100 mL of methanol and 1.0 mL of 1M hydrochloric acid was added. The mixture was stirred at 50° C. for 6 hours. The product was filtered and washed with copious amounts of methanol and dried under vacuum overnight. The product is highly hydrophobic and does not mix with water, forcing the formation of a meniscus in a test tube and forming a solid layer on the surface of the liquid. The material suspends by gentle shaking in toluene.

For further functionalization of the hydrophilic moiety inside mesopores, 0.56 g of the product from the previous acid washed step was suspended in 100 mL of anhydrous toluene, and 2.0 mL (7.1 mmol) of 3-[2-(2-aminoethylamino) ethylamino]-propyltrimethoxysilane (AEP) were added. The mixture was stirred at 100° C. for 20 hours. The product was filtered and washed with copious amounts of methanol and dried under vacuum overnight. This product is less hydrophobic than its precursor and can be suspended in water upon ultrasonication. The product gives a positive ninhydrin assay, indicative of the presence of primary amine groups.

D. Synthesis of Mesoporous Carbon Nanoparticles (MCN)

To prepare the MCN material, MCM-48 type mesoporous silica nanoparticle (MSN) material was first synthesized as the structure-directing template via a modified Stöber method. Cetyltrimethylammonium bromide (CTAB; 1.0 g) and a triblock copolymer (Pluronic F127, $EO_{106}PO_{70}EO_{106}$; 4.0 g) were mixed in 298 mL of $H_2O/NH_3/EtOH$ solution ($NH_4OH(aq)$ (2.8 wt %)/EtOH=2.5/1 (v/v)). Tetraethyl orthosilicate (TEOS; 3.6 g) was added into the solution at room temperature. After vigorous stirring for 1 minute, the reaction mixture was kept under static conditions for 1 day at 25° C. for the complete condensation of silica. The resulting solid MSN product was isolated by centrifuge, washed with copious amount of water, and dried at 70° C. in air.

For synthesis of the MCN, the silica was converted to an aluminosilicate form using a solution of $AlCl_3$ following the post-synthesis procedure: as-synthesized MCM-48 material was calcined at 550° C. to remove the surfactant. The calcined sample was mixed with distilled water to make surface silanol groups, and then completely dried at 150° C. The dried sample was slurried in ethanol solution of the anhydrous $AlCl_3$ (Si/Al=20). The ethanol solvent was completely evaporated by rotary evaporator. The dried sample was calcined again at 550° C.

Ordered mesoporous carbon nanoparticles MCNs were prepared using furfuryl alcohol (Aldrich) as a carbon source. Aluminated MCM-48 nanoparticles (1 g) were infiltrated with 0.91 mL of furfuryl alcohol by an impregnation method. The mixture was moved into Schlenk reactor, and subjected to freeze-vacuum-thaw three times using liquid $N_2$. The mixture was kept under vacuum at 35° C. for 1 hour. After opening the Schlenk reactor, the mixture was heated for 6 hours at 100° C. to polymerize the furfuryl alcohol, and was then partially carbonized at 350° C. for 3 hours under vacuum. After cooling to room temperature, 0.58 mL of furfuryl alcohol was added to the sample, and the freeze-vacuum-thaw and polymerization was repeated. Further carbonization was accomplished by heating to 900° C. under vacuum condition. The carbon product was collected by HF washing (10 wt % HF in $EtOH/H_2O$ solution).

The weight % of carbon for the MCNs was determined to be 98-100%, as measured by EDX and CHN elemental analysis. The MCN material assimilates a group of carbon nanotubes covalently bonded together; however, the synthesis of MCN and carbon nanotubes are very different. The thickness of the carbon fibers that make up the walls of the pores of the MCN material are roughly the same thickness of the pores from the mesoporous silica nanoparticles (MSNs) from which they were derived. Some contraction may occur during preparation steps, such as heating, but any contraction is believe to be minimal (<10%).

Material Characterization: Powder XRD diffraction data were recorded on a Scintag XDS-2000 instrument operated at 1.21 kW, using Cu Kα radiation. The nitrogen adsorption and desorption isotherms were measured at liquid nitrogen temperature (77 K) using a Micromeritics ASAP2000 volumetric adsorption analyzer. The Brunauer-Emmett-Teller (BET) equation was used to calculate the apparent surface area from adsorption data obtained at $P/P_0$ between 0.05 and 0.2. The total volume of micro- and mesopores was calculated from the amount of nitrogen adsorbed at $P/P_0=0.95$, assuming that adsorption on the external surface was negligible compared to adsorption in pores. The pore size distributions (PSD) were calculated by analyzing the adsorption branch of the $N_2$ sorption isotherm using the Barrett-Joyner-Halenda (BJH) method.

Scanning electron microscopy (SEM) images were obtained with a JEOL 840A scanning electron microscope operating at 10 kV. The samples were coated with gold before SEM measurement. Transmission electron microscopy (TEM) images were taken from particles supported on a porous carbon grid, using a Tecnai G2 F20 equipment operated at 200 kV. The ζ-potential was measured in a Malvern Nano HT Zetasizer at a concentration of 500 μg/mL in phosphate buffered saline (PBS). The pH 7.5 buffer was composed of 0.27 mM KCl, 0.15 mM KH2PO4, 13.6 mM NaCl and 0.81 mM Na2HPO4.7H2O in nanopure water. $^{13}C$ solid-state NMR experiments were carried out on a Bruker AVANCE-II 600 MHz (14.1 T) spectrometer using a 4 mm triple-resonance MAS probe.

Example 2

Selective Sequestration of Compounds Using Mesoporous Particles

Part 1. Algae Cultures

A. Algae Culture Maintenance

*Botryococcus braunii*, *Chlorella* sp. and *Neochloris conjuncta* were grown on a modified Chu 13 medium; see Table 1. Pre-cultures were carried out in 250-mL Erlenmeyer flasks with shaking at 100 rpm; at 25° C.; light flux density 40 $\mu Em^{-1}s^{-1}$; light-dark cycle 14 hours/10 hours; inoculation at 10% (v/v). Stock cultures were maintained routinely by regular subculturing at 2-week intervals. Sterile-air containing 1% $CO_2$ was aerated into the culture flasks at rate of 100 mL/minute to maintain the pH of the medium ~8-9.5.

TABLE 1

Composition of Modified Chu 13 Medium*

| Composition | Concentration (g/L) |
| --- | --- |
| Potassium Nitrate | 0.4 |
| Potassium phosphate monobasic | 0.08 |
| Calcium chloride•$2H_2O$ | 0.107 |
| Magnesium sulfate•$7H_2O$ | 0.2 |
| Citric acid | 0.1 |
| Ferric citrate | 0.01 |
| Cobalt chloride | 0.02 |
| Boric Acid | 0.00572 |
| Manganese chloride•$4H_2O$ | 0.00362 |
| Zinc sulfate•$7H_2O$ | 0.0044 |
| Sodium molybdonate | 0.000084 |

*See Dayananda et al., "Autotrophic cultivation of *Botryococcus braunii* for the production of hydrocarbons and exopolysaccharides in various media"; Biomass Bioenergy 2007, 31, (1), 87-93.

B. Hexane Extraction and Reculturing Conditions

Algae were concentrated by centrifugation at 4000 rpm for 2.5 minutes prior to extraction, and ~90% of the medium was removed. Hexanes (HPLC grade) were used for extraction of hydrocarbons. During the extraction, one volume (10 mL of stock culture) of concentrated algae was thoroughly dispersed in one volume (10 mL) of hexanes by vortexing for 1-2 minutes, following by centrifugation (FIG. 1). At the end of the extraction step, the hexane was collected for analyses and the algae were washed once with one volume (10 mL) of the original medium and recultured in one volume (10 mL) of fresh medium (pH~9). On average only about 20% of the algae were lost through the centrifugation and hexane extraction steps.

C. Biomass Estimation, Cell Viability, and Cell Count

Figure 2:
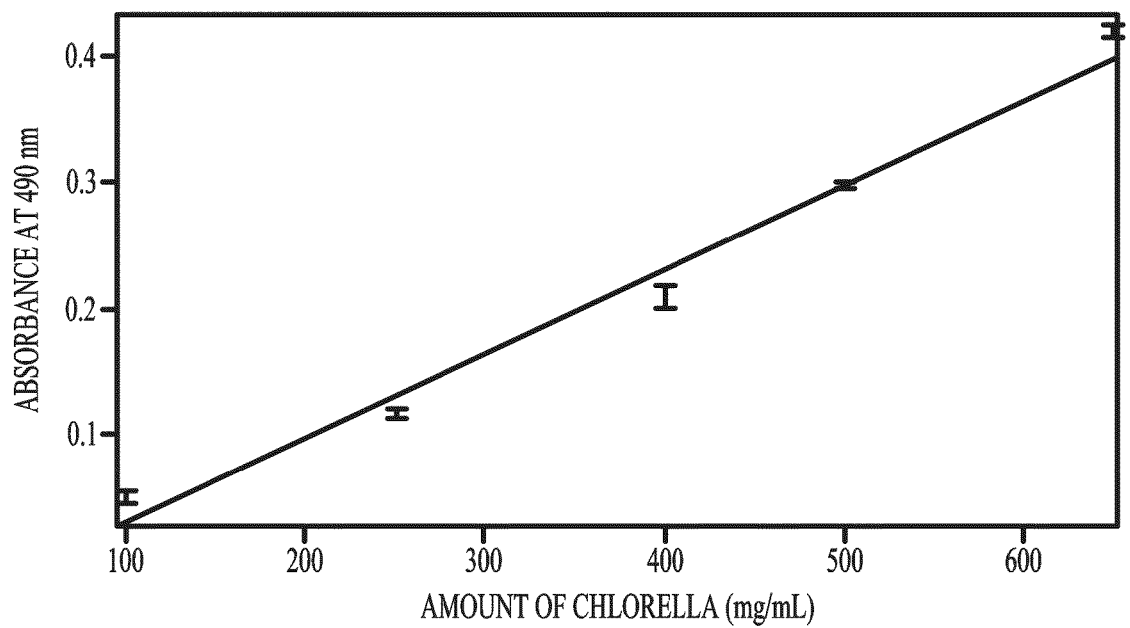
FIG. 2 illustrates a UV-Vis assay of the growth state of mature vs. dying algae, showing the relationship between 3-(4,5-dimethylthiazol-2-yl)-5-(3-carboxymethoxyphenyl)-2-(4-sulfohphenil)-2H-tetrazolium (MTS) reduction and cell density of *Chlorella* sp. algae cultures, according to an embodiment. A strong linear correlation is evidenced by the linear trend line calculated from the data points.

The cells were washed with distilled water after centrifugation at 4000 rpm for 2.5 minutes, followed by freeze dry dehydration. The dry weight of algal biomass was determined gravimetrically. The algae cell densities were counted by flow cytometry using Guava PCA system. The CellTiter 96® AQueous One Solution Cell Proliferation Assay (Promega Corporation, WI, USA) was used to detect cell viability. See Capasso et al., "A colorimetric assay for determination of cell viability in algal cultures"; *Biomol. Eng.* 2003, 20, (4-6), 133-138. Saturated algae culture (650 µL) were placed in a 1.5 mL microtube, to which 100 µL of the CellTiter 96® solution was added. The tubes were then mixed and incubated in the same conditions as the original cultures for one hour, followed by centrifugation at 14000 rpm for 1 minute. Reduction of the MTS tetrazolium compound to formazan was detected by UV-Vis spectrometer at 490 nm. The relationship between absorbance at 490 nm and cell density of *Chlorella* cultures was linear (FIG. 2) with a very significant correlation coefficient ($R^2$=0.987).

D. Preparation of MCN Matrix Sample for MALDI-MS Experiments

*Botryococcus braunii* in Chu-13 medium (5 mL) was mixed with hexanes (10 mL) and was shaken for five minutes to facilitate extraction of microalgal oils. MCN material was added to the hexane extract of *B. braunii* and the mixture was incubated at room temperature for 30 minutes. Following incubation for MCN to sequester desired FFAs, the MCN were separated from the hexane solution by filtration and dried at room temperature. The MCN-FFAs were characterized by MALDI-MS using MCN as the matrix.

Part 2. Experimental Results

A. Materials. The four mesoporous materials described in Example 1, MSN, PMIm-IL-MSN, $C_{16}$-AEP-MSN, and MCN, were characterized with nitrogen sorption analysis, powder X-ray diffraction (XRD), and scanning and transmission electron microscopy.

Figure 3A:
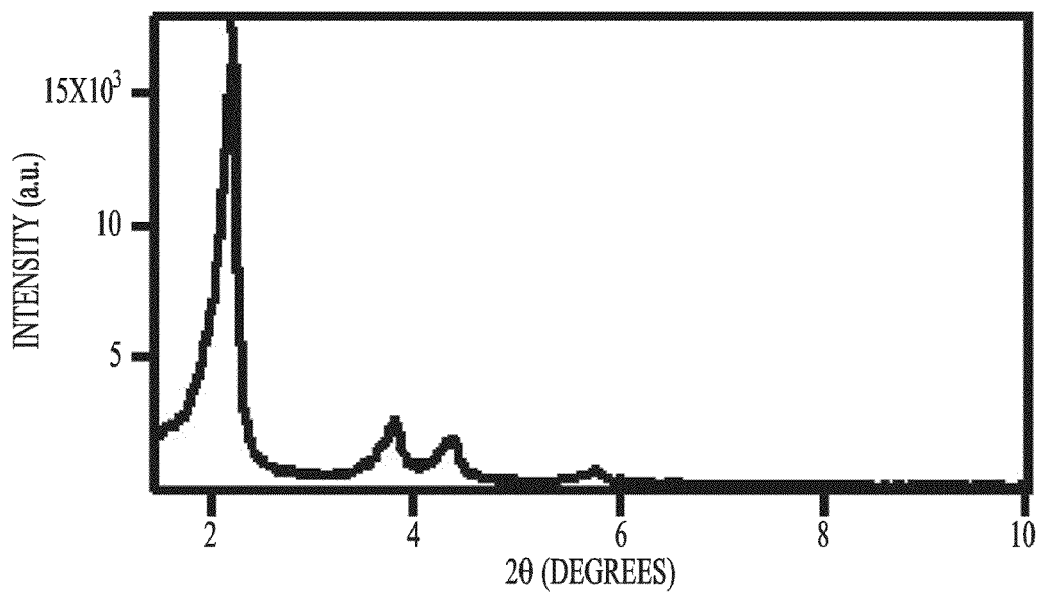
FIG. 3 illustrates powder XRD patterns of (a) nonfunctional MSN and (b) ionic liquid functional MSN, according to certain embodiments of the invention.
Figure 5A:
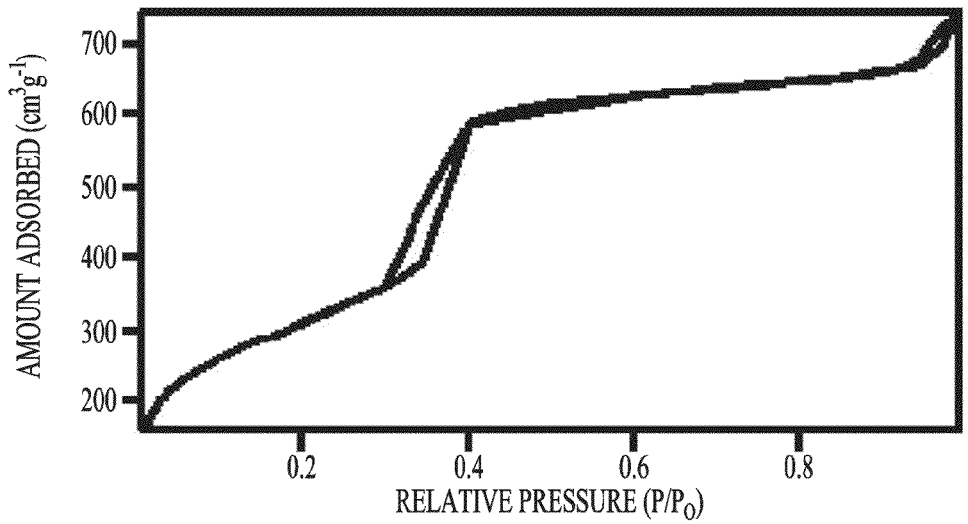
FIGS. 5, 6, 7, and 8 illustrate nitrogen sorption isotherms (top graphs) and the respective pore size distributions (bottom graphs) of nonfunctional MSN, ionic liquid functional MSN, bifunctional MSN, and MCN, respectively, according to embodiments of the invention.
Figure 5B:
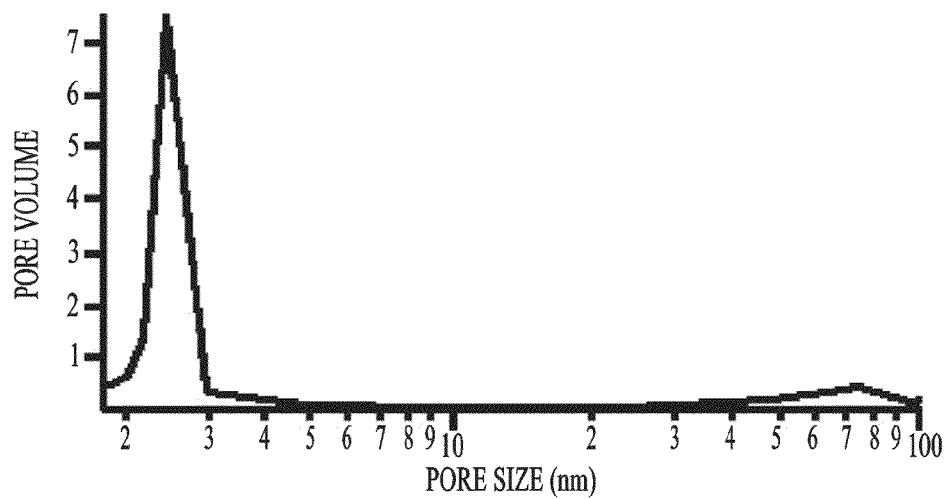
Figure 9:
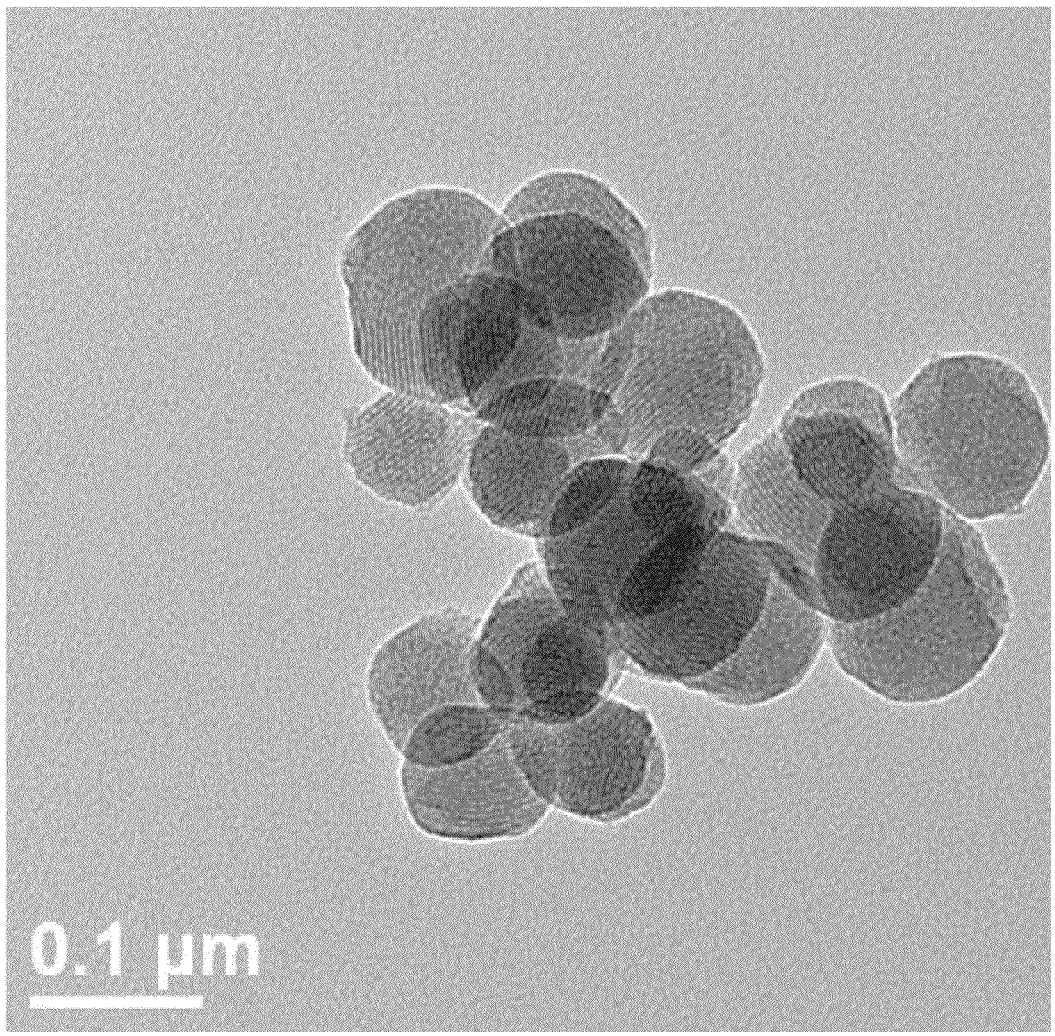
FIG. 9 illustrates a transmission electron micrograph (TEM) of nonfunctionalized MSN at 35,000×.

Powder XRD analysis of the CTAB-removed MSN material confirmed hexagonally arranged mesopores in the diffraction pattern as evidenced by the intense $d_{100}$ peak, along with well-resolved $d_{110}$ and $d_{200}$ peaks (FIG. 3a). The $N_2$ adsorption/desorption isotherms of the MSN material further revealed a BET isotherm typical of MCM-41 structure (type IV) with a surface area of 941 $m^2$/g and a narrow BJH pore size distribution (average pore diameter=2.3 nm) (FIG. 5). The TEM micrographs showed spherical particles (75-100 nm in diameter) with pores continued through the entirety of the particle (FIG. 9).

Figure 3B:
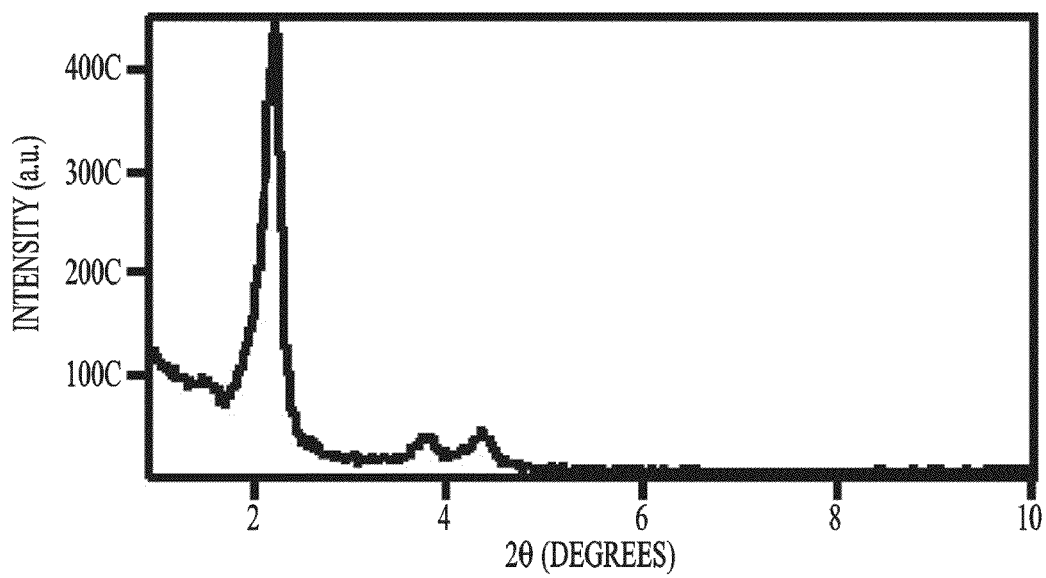
Figure 6A:
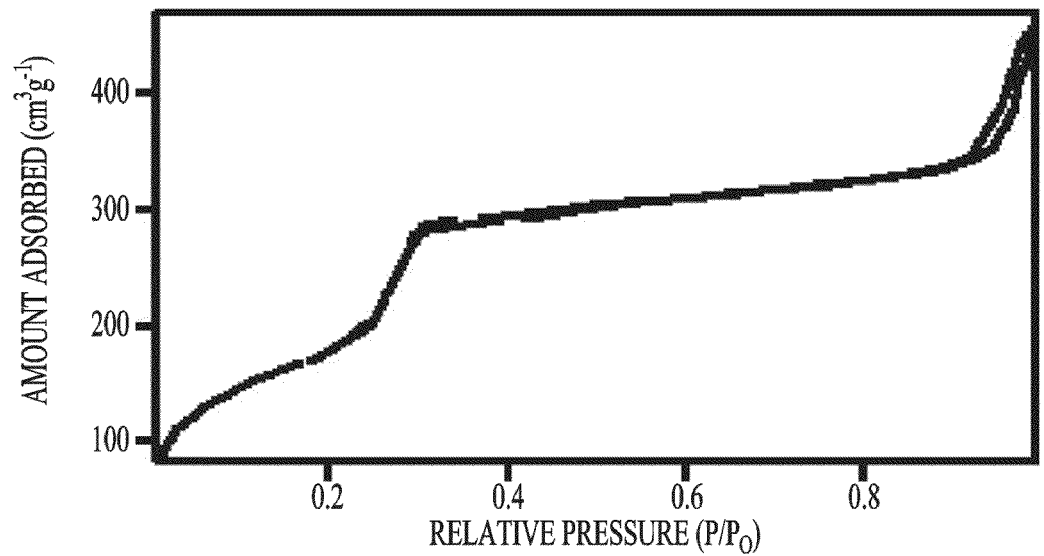
Figure 6B:
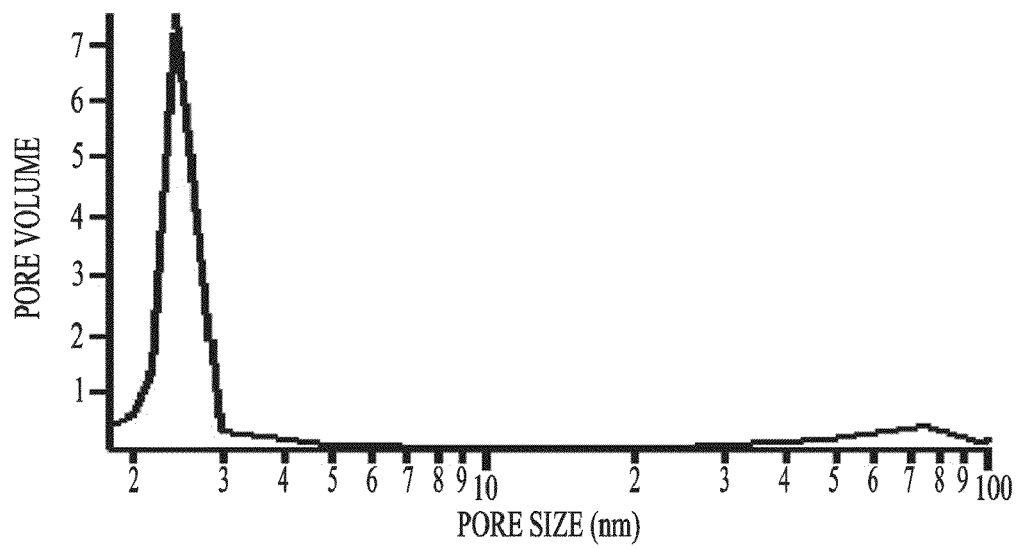
Figure 7A:
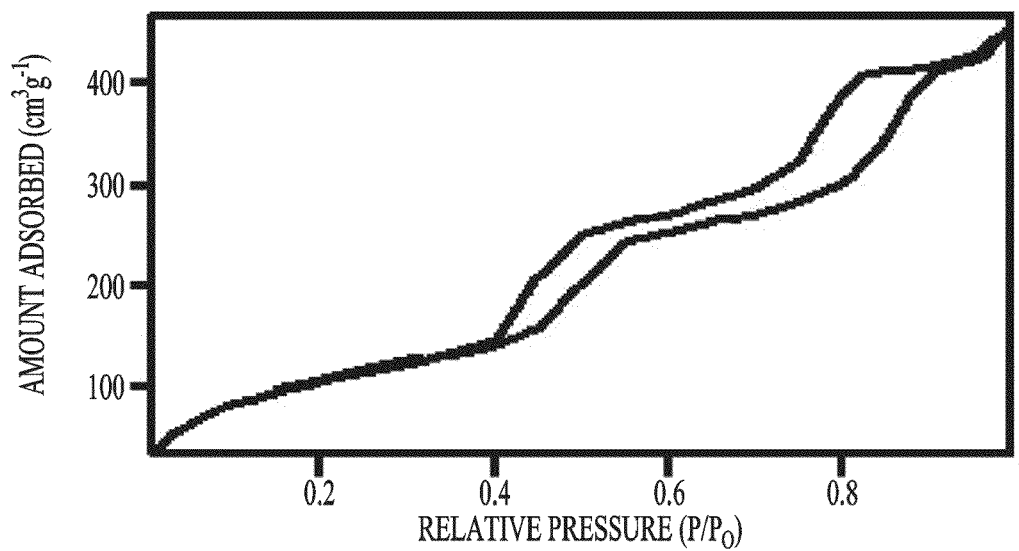
Figure 7B:
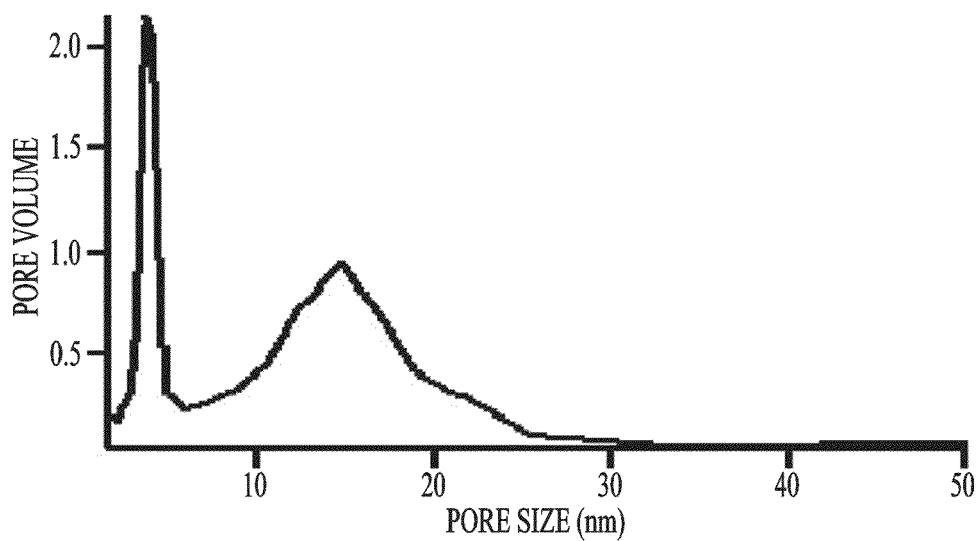
Figure 10:
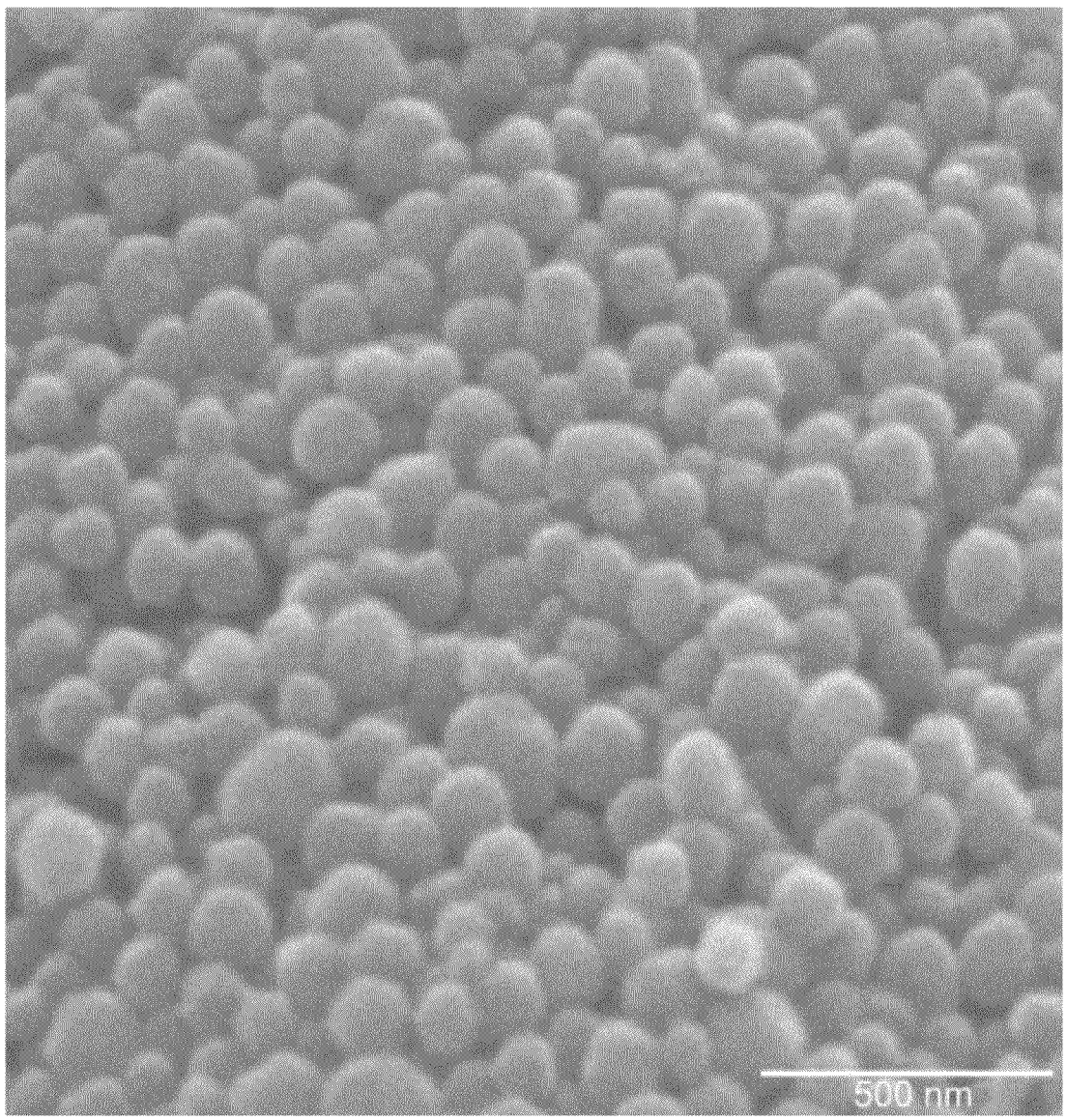
FIG. 10 illustrates a scanning electron micrograph (SEM) of IL-MSN.
Figure 11:
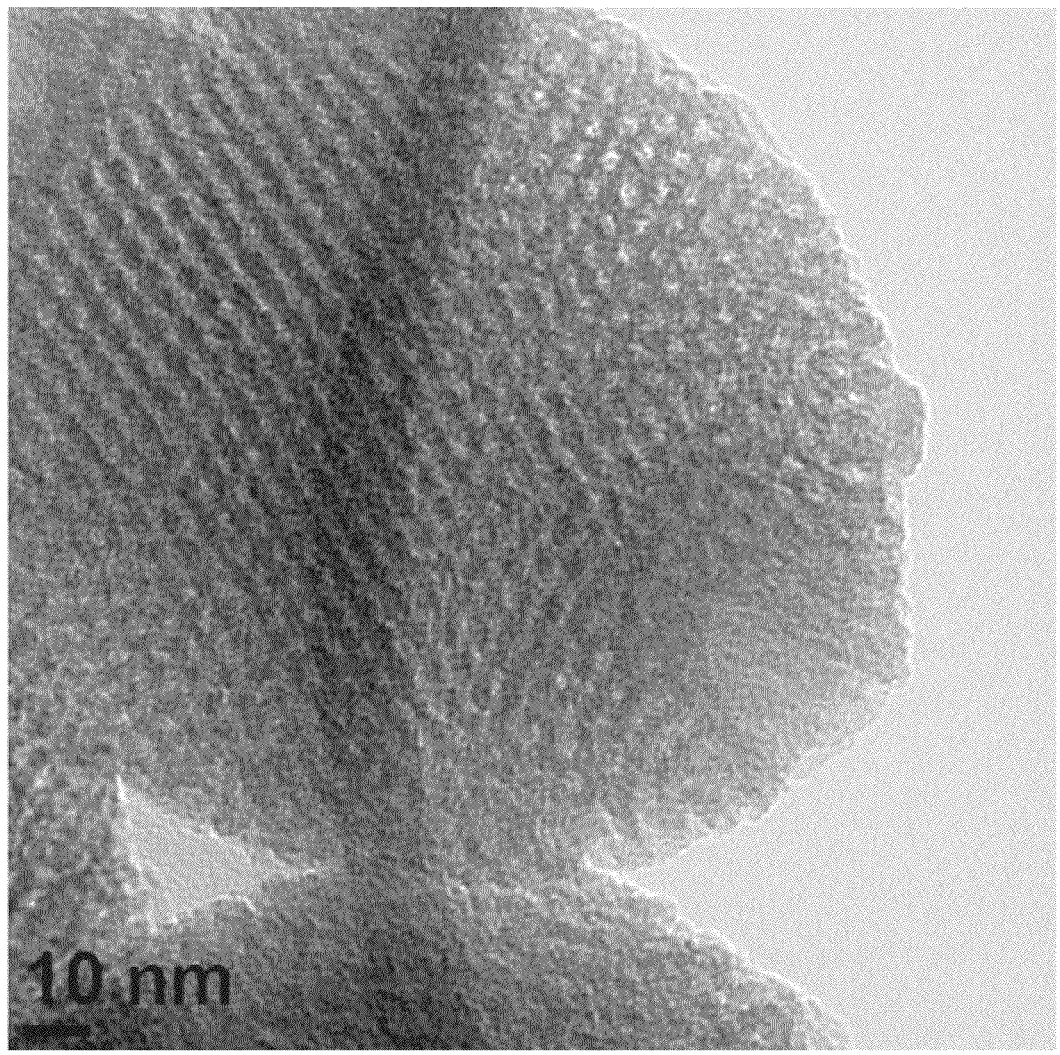
FIG. 11 illustrates a transmission electron micrograph of $C_{16}$-AEP-bifunctional MSN.

In addition to the characterization techniques listed above, the PMIm-IL-MSN was analyzed by the $^{13}C$ solid state NMR. From these analyses, MSN externally grafted with ionic liquid moieties were shown to have highly ordered mesostructures with 2-D hexagonal symmetry (FIG. 3b), high surface area, and well-developed mesopores of 2.1 nm in diameter (FIG. 6), which is similar to nonfunctional MSN materials. Further investigation of the morphological aspects was performed by SEM and TEM (FIG. 10), showing monodispersed spherical nanoparticles approximately 100 nm in diameter. In addition, the high resolution TEM image confirms that PMIm-IL-MSN is a highly ordered 2-D hexagonal mesostructure. The $^{13}C$ NMR shows the expected peaks for PMIm on the surface of the MSN. The characteristic imidazolium resonances are present at 123 and 136 ppm. PMIm is the only carbon source on our material, indicating that the PMIm IL-trimethoxysilane has become incorporated into the structure of the MSN.

Figure 4A:
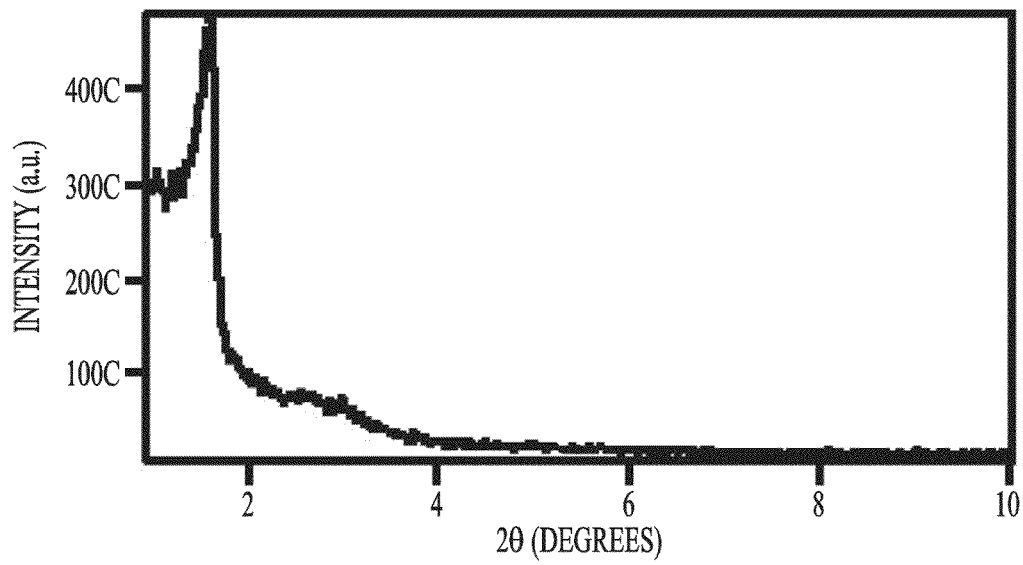
FIG. 4 illustrates powder XRD patterns of (a) bifunctional MSN and (b) MCN, according to certain embodiments of the invention.

As depicted in FIG. 4a, the observed XRD patterns for bifunctional large-pore MSN ($C_{16}$-AEP-MSN) exhibited a strong $d_{100}$ peak and a broad peak consisting of the combination of $d_{110}$ and $d_{200}$ diffractions, caused by the grafting of the large organic molecules. The nitrogen surface sorption analysis of this material exhibited a type IV isotherm with a BET surface area of 800 $m^2$/g. The BJH method gave two pore size distributions at 3.6 nm (major peak) and 14.5 nm (minor peak). Electron microscopy analysis of this bifunctional material shows oval-shaped particles approximately 300 nm long. In addition to particle morphology, TEM analysis shows that this material comprised of an MCM-41 type, hexagonal array of mesoporous channels.

Figure 4B:
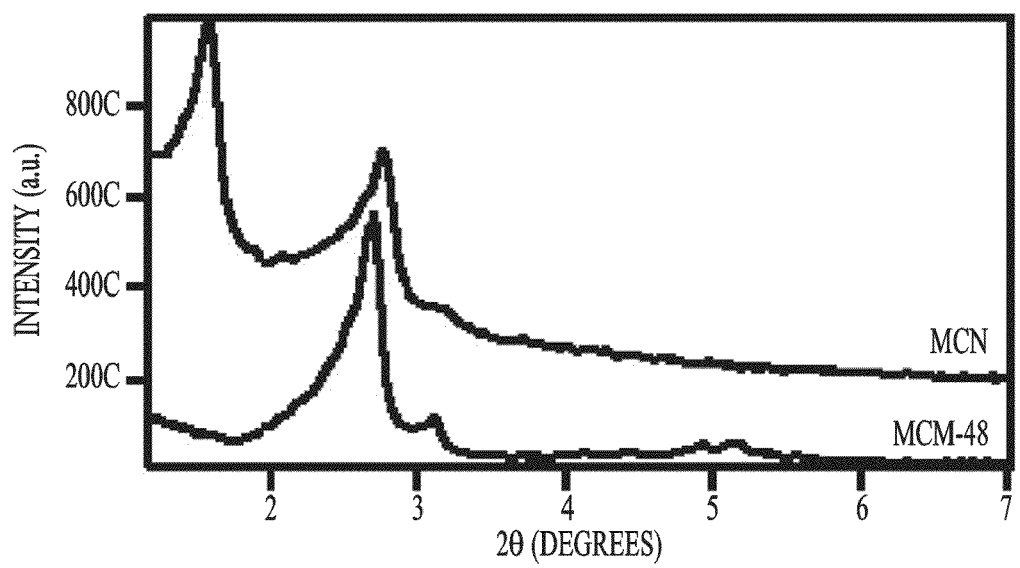
Figure 8A:
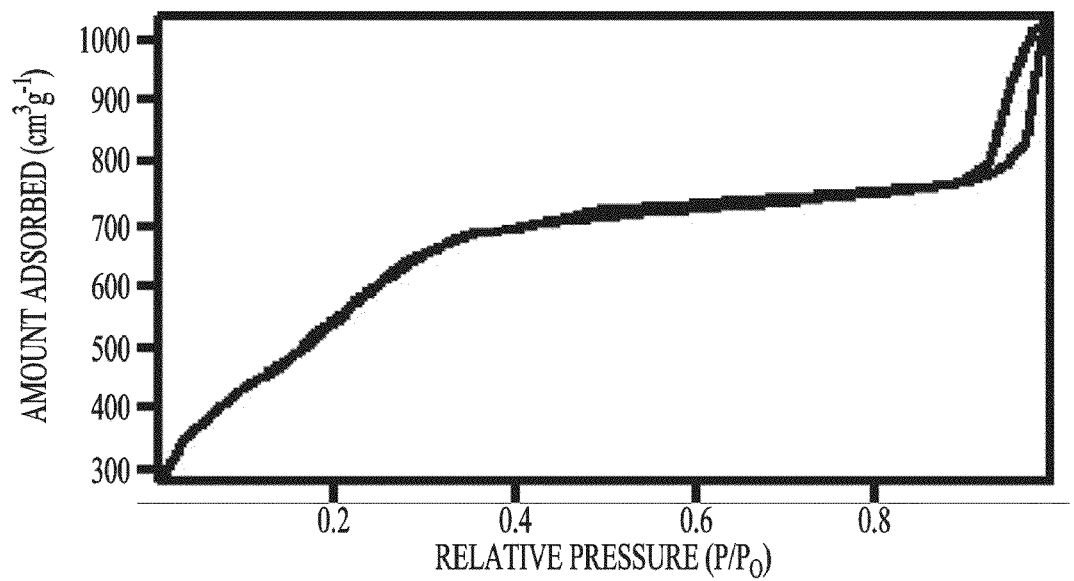
Figure 8B:
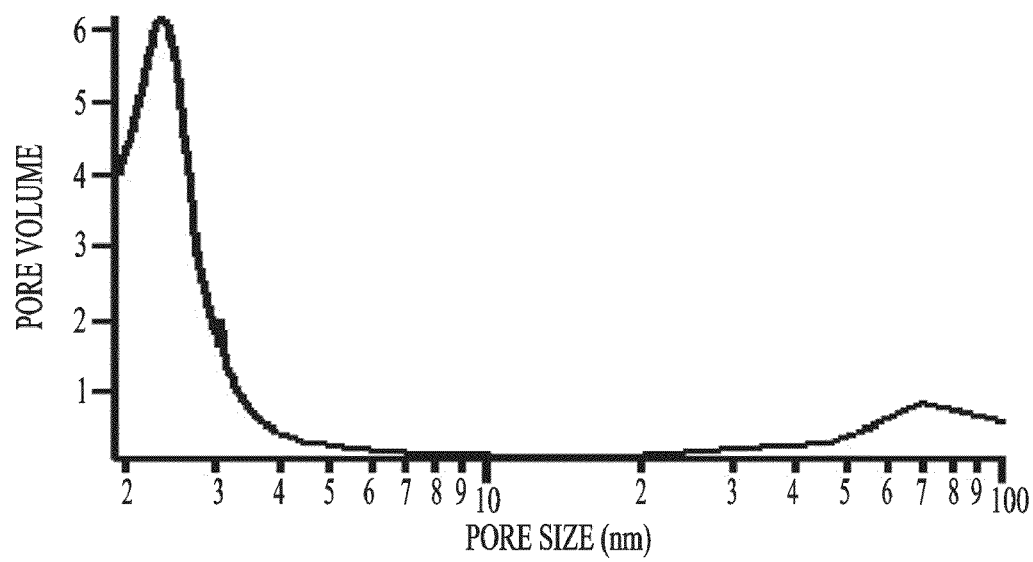

As depicted in FIG. 4b, the XRD patterns of MSN and MCN also validated the transformation from the cubic Ia-3d (MCM-48 type) to the tetragonal I$4_1$/a (or lower) mesoporous structure after the carbon replication process. The $N_2$ sorption isotherm (FIG. 8) exhibited two capillary condensation steps at $P/P_0=0.18$-$0.3$ and $>0.95$, which could be attributed to the $N_2$ condensation that took place at the internal mesopores and the interparticle voids, respectively.

Figure 12A:
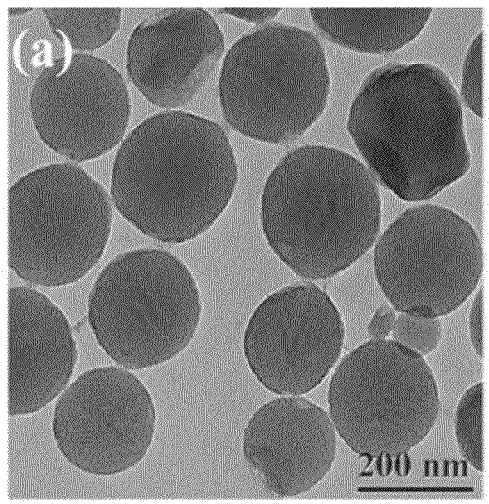
FIG. 12 illustrates low magnification TEM images of (a) mesoporous silica MCM-48 nanoparticles; (b) mesoporous carbon nanoparticle (MCN) materials; and high magnification TEM images of (c) MCM-48 nanoparticle and (d) MCN material with the corresponding Fourier diffractograms (insets) showing the pore lattice pattern.
Figure 12B:
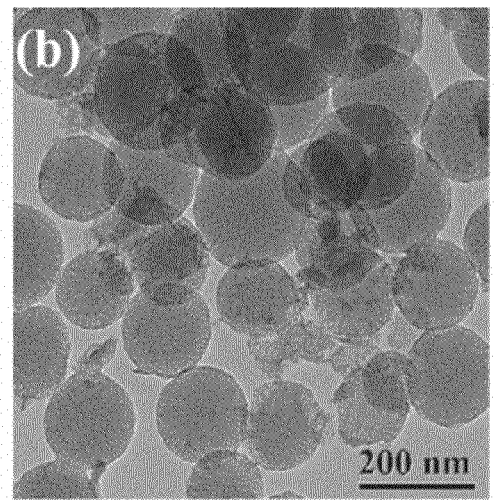
Figure 12C:
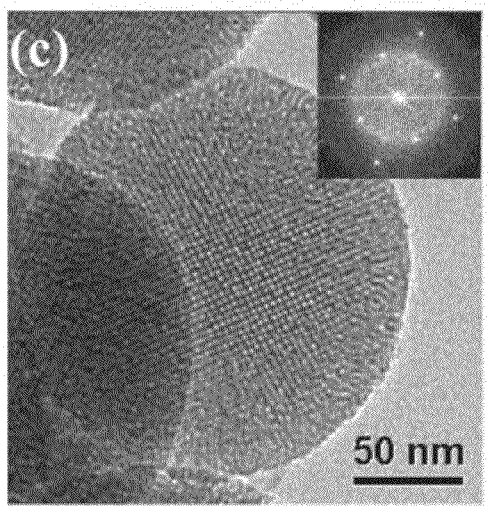
Figure 12D:
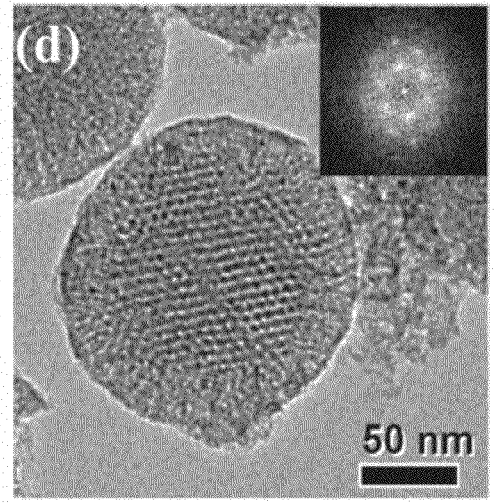

It was determined that MCN has large BET surface area (2000 $m^2/g$) and pore volume (1.2 $cm^3/g$) (Table 2). The BJH pore size distribution showed an average pore diameter of 2.4 nm. The MCN material is consisted of monodisperse (100-200 nm) spherical nanoparticles (FIG. 12*b*). TEM micrographs (FIGS. 12*b* and 12*d*) of MCN showed a tetragonal $I4_1/a$ (or lower) mesoporous structure, which is the exact replication of the cubic Ia-3d porous morphology of MSN template. The high-magnification TEM images of MSN and MCN materials (FIGS. 12*c* and 12*d*) confirmed the highly ordered mesoporous structures throughout the entire particle of these materials.

TABLE 2

Microalgal oil sequestration nanomaterial properties

| | Surface Area ($m^2/g$) | Pore Size (nm) | Zeta Potential (mV) |
|---|---|---|---|
| MSN | 941 | 2.3 | −35.2 |
| PMIm-IL-MSN | 660 | 2.1 | 43.3 |
| $C_{16}$-AEP-MSN | 800 | 3.6 | NA* |
| MCN | ~2000 | 2.4 | NA* |

*samples were too hydrophobic to accurately measure surface charge

B. Regrowthability. From the study described herein, it was found that the contact time and pH of reculturing medium are two significant factors for algae recovery. As the contact time of the organic extracting solvent (hexanes) with the aqueous algae suspension decreased from 5 minutes to less than about 1 minute, the recovery rate doubled (Table 3).

TABLE 3

Algae Recovery Rate in pH 9 Medium (evaluated by viability).

| Contact time | 1 day | 2 days | 1 week | 2 weeks |
|---|---|---|---|---|
| 30 sec vortex | 0 | 35% | 70% | 100% |
| 5 min shaking | 0 | 0 | 30% | 60% |

Algae recultured in lower pH (pH~7.5) medium showed a slower recovery rate compared to that in higher pH (pH~9) (Table 4). Recultured algae were extracted again two weeks after reculturing. Both the cell density and viability doubled as compared to the first extraction. This high recovery speed can be attributed to the high cell density and viability with respect to the extraction process.

TABLE 4

Algae Recovery Rate when Vortexed with Hexane (evaluated by viability)

| Contact time | 1 day | 2 days | 1 week | 2 weeks |
|---|---|---|---|---|
| pH ~7.5 | 0 | 7% | 50% | 95% |
| pH ~9 | 0 | 35% | 70% | 100% |

C. Investigation of MCN materials and *B. braunii* by Differential Interference Contrast (DIC) Microscopy. As shown in previous sections, the synthesized MCN are very hydrophobic and show high affinity to non-polar molecules such as FFAs and triglycerides. As pictured in FIG. 13, *B. braunii* is a single-cell organism that has a tear-drop shape. The MCN materials were added to the algae culture solution and the images were collected after 12 hours of incubation (see FIG. 14). FIG. 14 was taken by a 40× oil immersion objective. The main features in FIG. 14 are the MCNs, shown as aggregates of black material.

Figure 13:
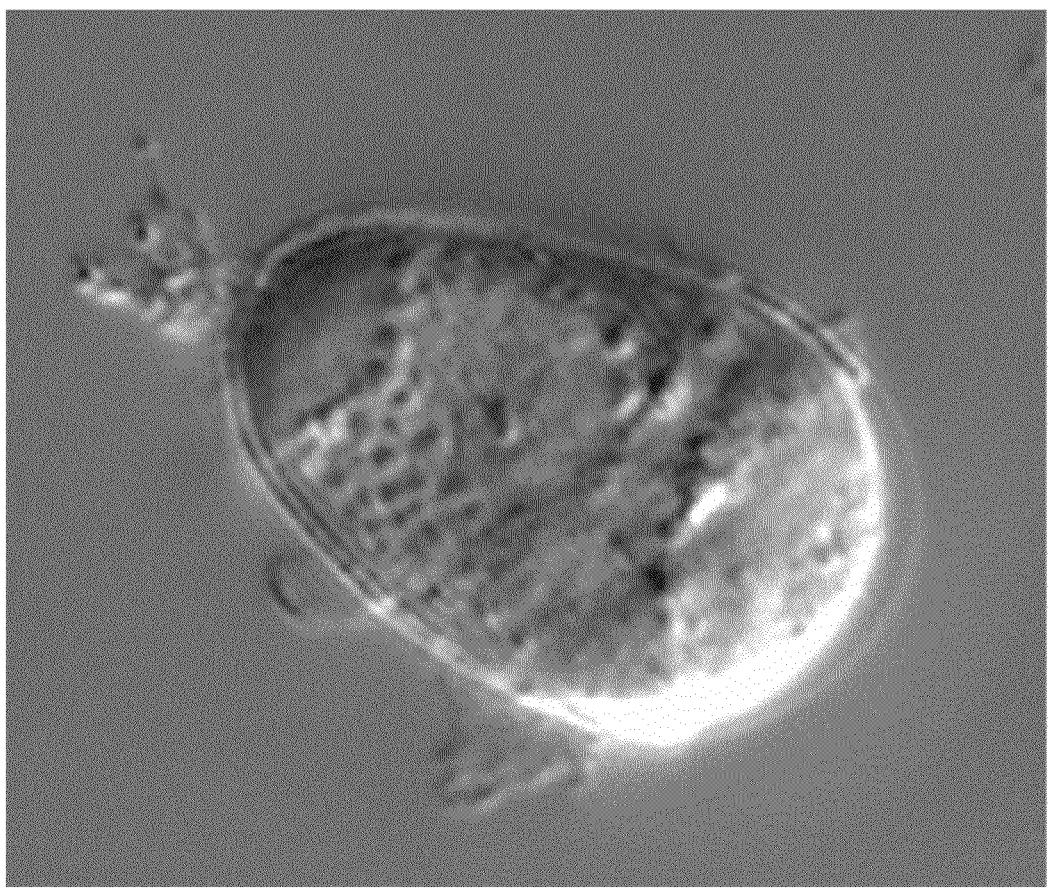
FIG. 13 illustrates an image of *B. braunii* before addition of MCN material (1000× magnification).
Figure 14:
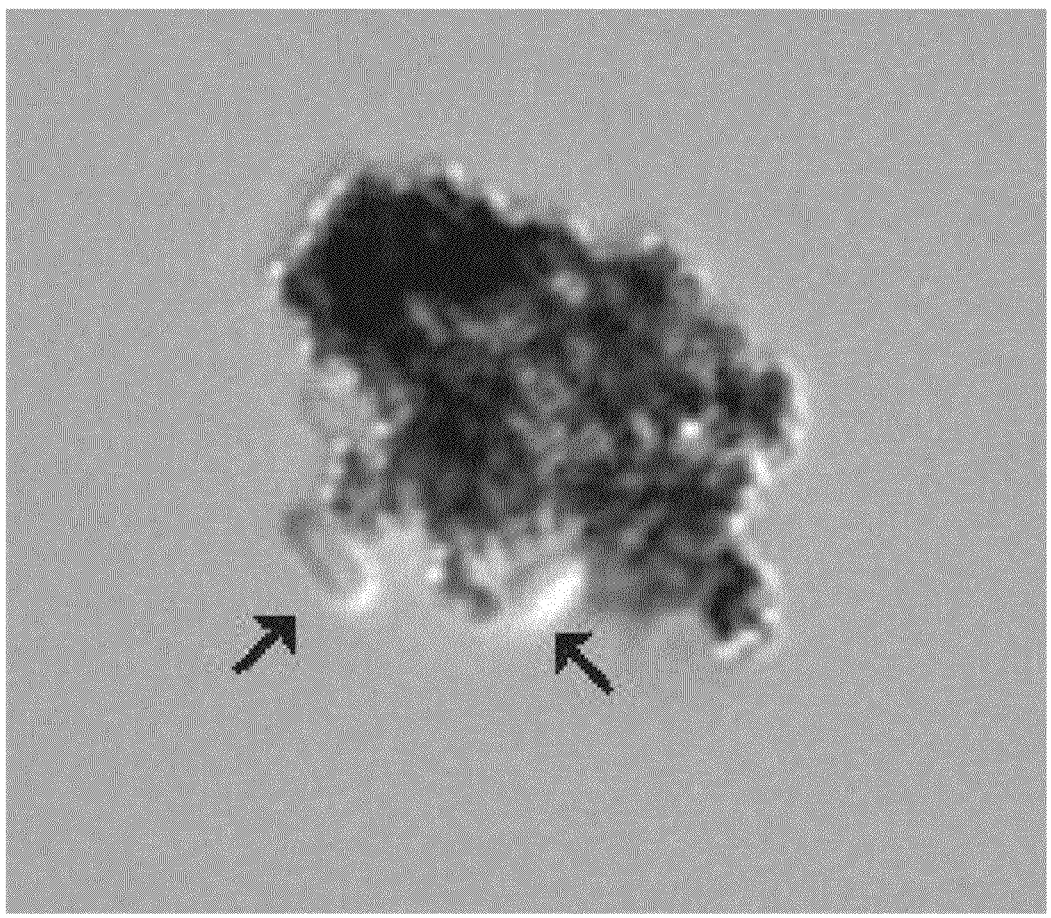
FIG. 14 illustrates an image of *B. braunii* after addition of MCN material (1000× magnification). The black features in the figure are aggregates of MCN materials. The black arrows indicate the lipid biofilm residues of the algal colonies.

FIG. 13 shows a viable (live) algae cell before MCN is added to the *Botyrococcus braunii* microalgae culture. The intact microalgae cell is clearly visible with cell wall and subcellular artifacts. In FIG. 14, the black MCN can be observed having affinity for the microalgae cell. The entire cell is covered by the black MCN particles. The arrows in FIG. 14 show the presence and location of lipid biofilm residues.

*B. braunii* is know to be rich in organic oils and lipids. Upon the addition of MCN materials, these hydrophobic species (both MCN and lipids of *B. braunii*) rapidly aggregated together in aqueous cultural environments. Inspection of FIGS. 13 and 14 shows that more than 90% of the surface area of the *B. braunii* was covered by MCN materials. Thus only a small portion of lipid biofilm residues of the algal colonies was still observable at certain depth of the images. These features are indicated in FIG. 14 by black arrows. Therefore, it was concluded that the synthesized MCN are ideal materials for selectively collecting the oils and lipids inside of the *B. braunii* due to their high hydrophobicity.

Figure 15A:
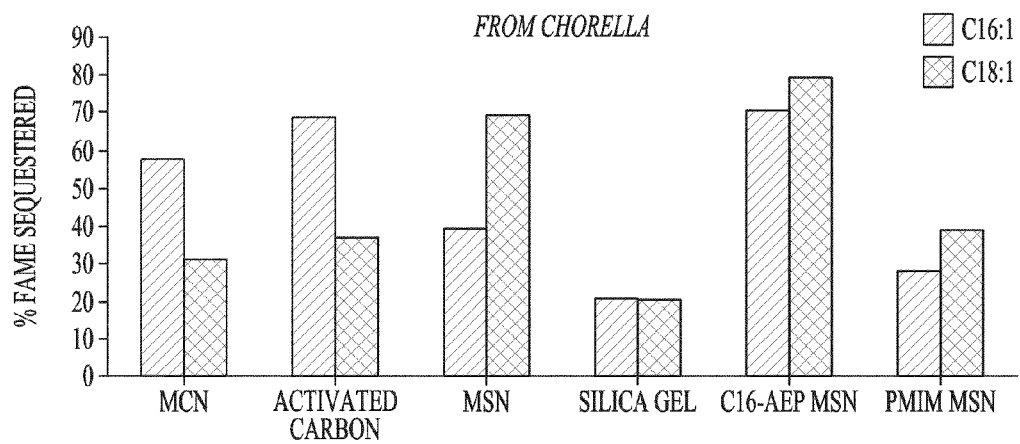
FIG. 15 illustrates the selectivity of FAME uptake by different synthesized mesoporous materials compared to commercially available activated carbon and silica gel. The selectivity of FAME sequestration was measured in two microalgae species: (a) *Chlorella* and (b) *Neochloris*.
Figure 15B:
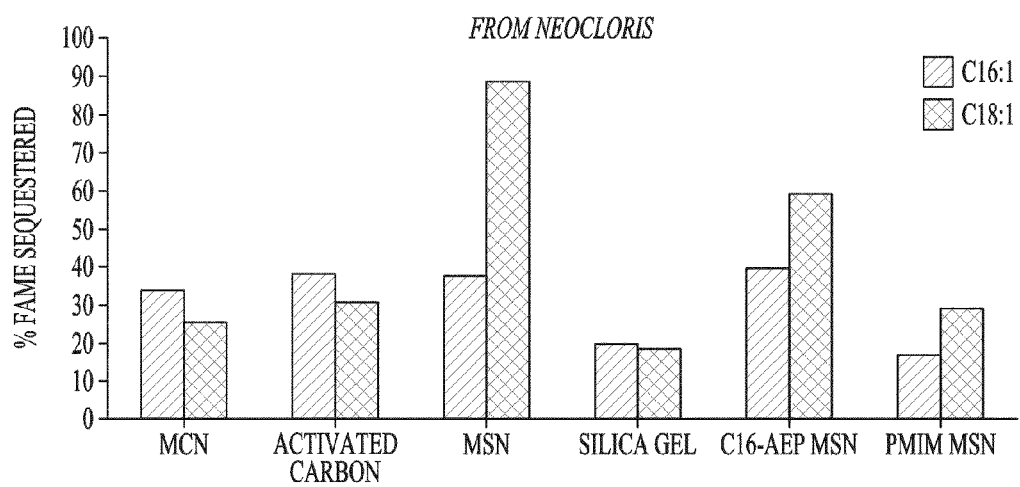

D. Extraction Efficiency. Of the four efficient materials for the sequestration of free fatty acids from microalgal oil: MSN, PMIm-MSN, C16-AEP-MSN, and MCN; MSN and C16-AEP-MSN have exhibited the highest selectivity for methyl stearate (C18:1) over methyl palmitate (C16:1) for both *Chlorella* sp. and *Neochloris conjucta* (FIG. 15). The quantity of measured fatty acid methyl esters is reported as the amount recovered from our material after sequestration and esterification. The values reported are measured via capillary gas chromatography using hydrogen and air as carrier gases through a DB-WAX column.

MSN sequestered 70-90% of the available C18:1 and 35-40% of the available C16:1, respectively, from the algal feedstock. The bifunctional large-pore C16-N3-MSN sequestered 60-80% and 40-80% of the total C18:1 and C16:1, respectively. Contrarily, MCN has exhibited a higher efficiency for C16:1 over C18:1, sequestering 40-60% and 25-40%, respectively.

Both mesoporous carbon and mesoporous silica were compared to their respective commercially available counterparts; activated carbon and amorphous silica gel, respectively. The percent sequestration and selectivity of MCN and activated carbon is comparable. However, activated carbon is not a suitable matrix for MALDI-MS analysis. The percent sequestration of amorphous silica is much less than MSN and amorphous silica gel provides no measurable selectivity. Additionally, MSN can sequester 3.5-6 times more C18:1 and C16:1 than amorphous silica gel.

Figure 16:
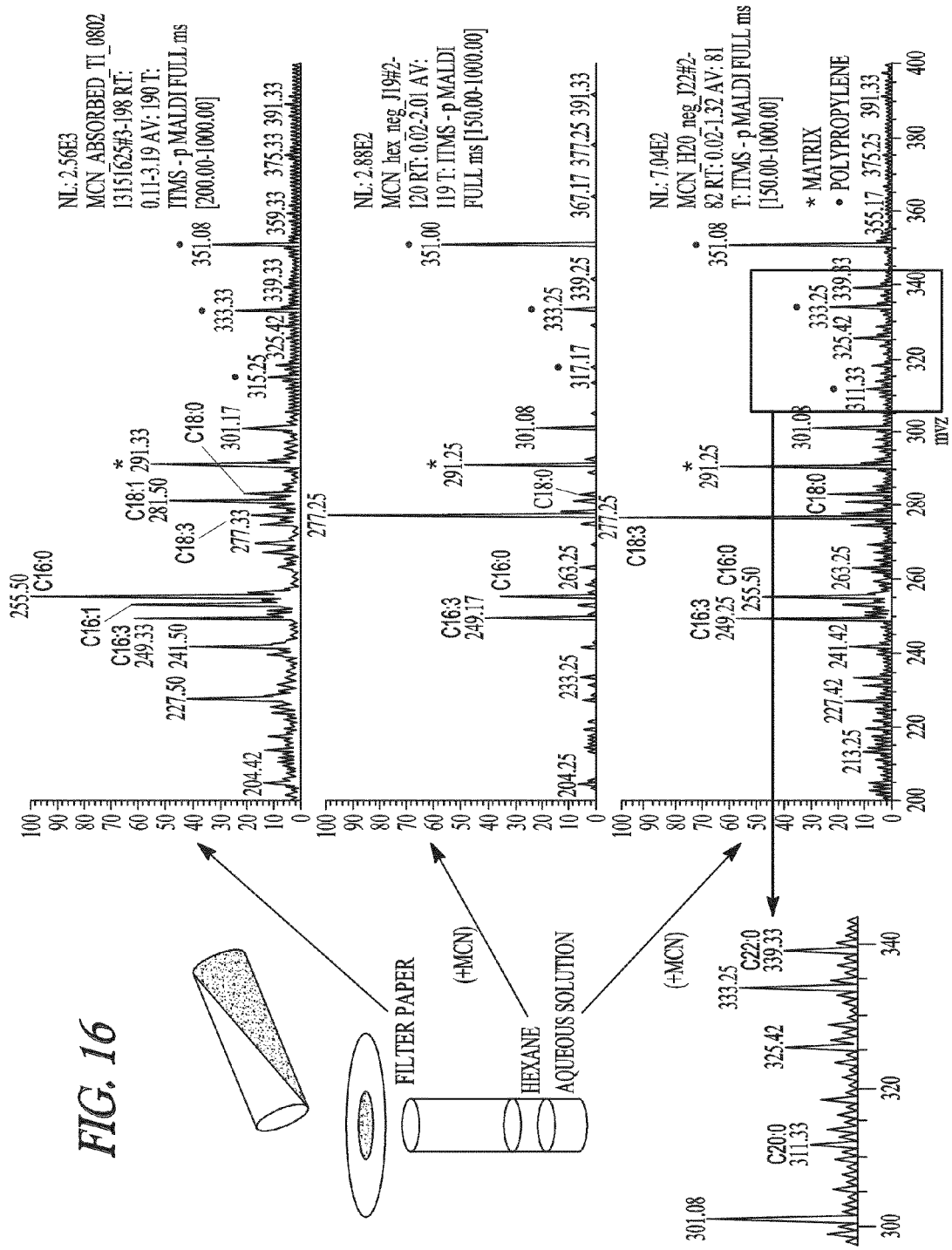
FIG. 16 illustrates MALDI-Mass Spectrometry profiles of microalgae oils converted to methyl esters sequestered by MCN, using MCN as matrix.

This Example demonstrates that the MCN described herein possesses strong absorptivity to hydrophobic substances, which can be attributed to its unique porosity, hydrophobicity, and high surface area. Results from the MALDI-MS incorporating MCN as the matrix indicate that most of the short chain fatty acids were adsorbed by MCN, but long chain fatty acids were not (C22 and C24). It was observed that saturated C14, C15, and monounsaturated C16, C18 are selectively retained by the MCN, and no measurable amount of these fatty acids were observed in the hexane or aqueous solution. The hexane extract included measurable amounts of saturated C16, C18, and amounts of triunsaturated C16 and C18 fatty acids. This indicates that MCN exhibits selective absorptivity between long chain and short chain fatty acids (FIG. 16). In addition, the different affinities to MCN among those fatty acids produced from algae can be categorized.

Figure 17:
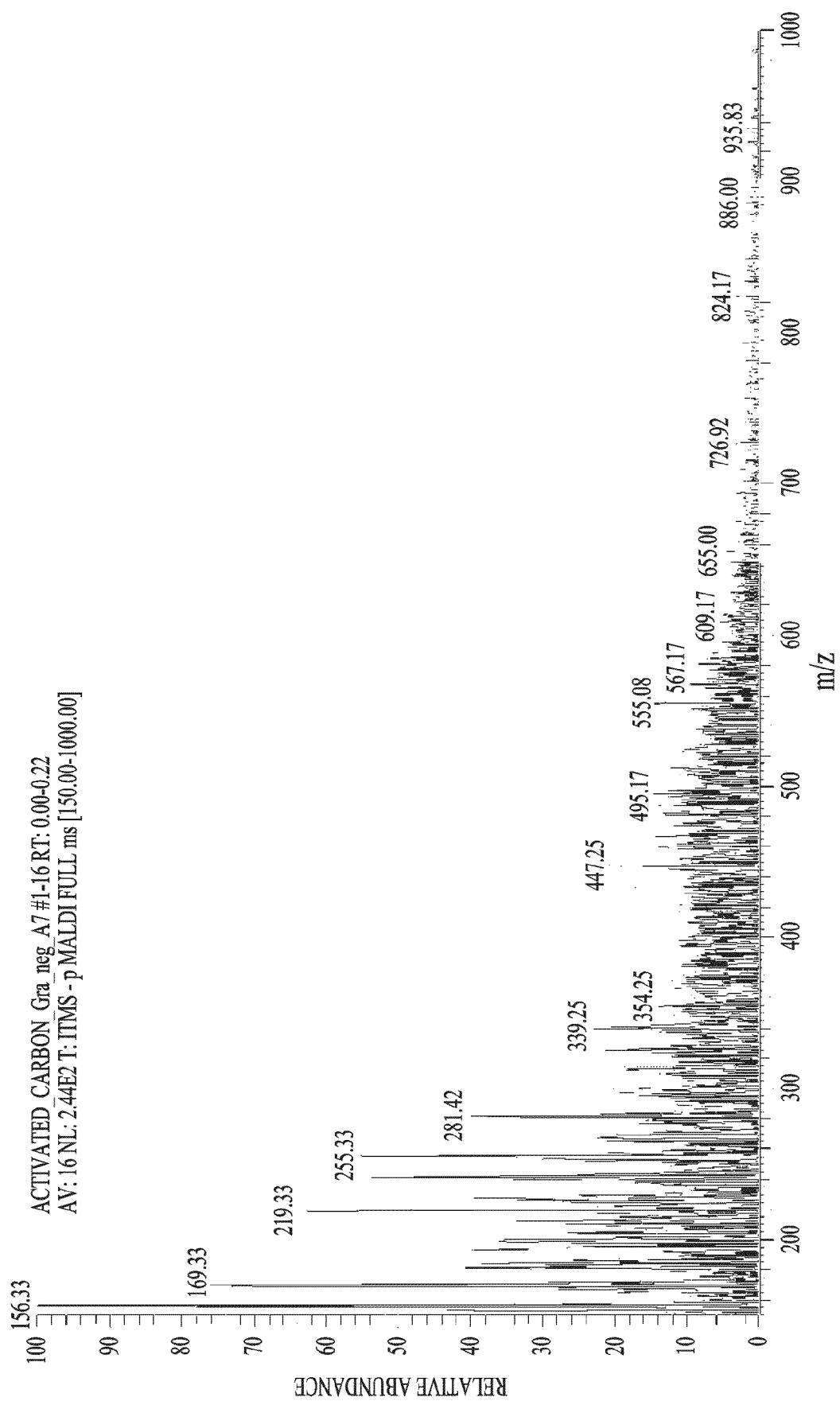
FIG. 17 illustrates MALDI-Mass Spectrometry profiles of microalgae oils from *Chlorella* converted to methyl esters using activated carbon as the matrix, illustrating the poor signal-to-noise ratio of activated carbon (cf.
Figure 18:
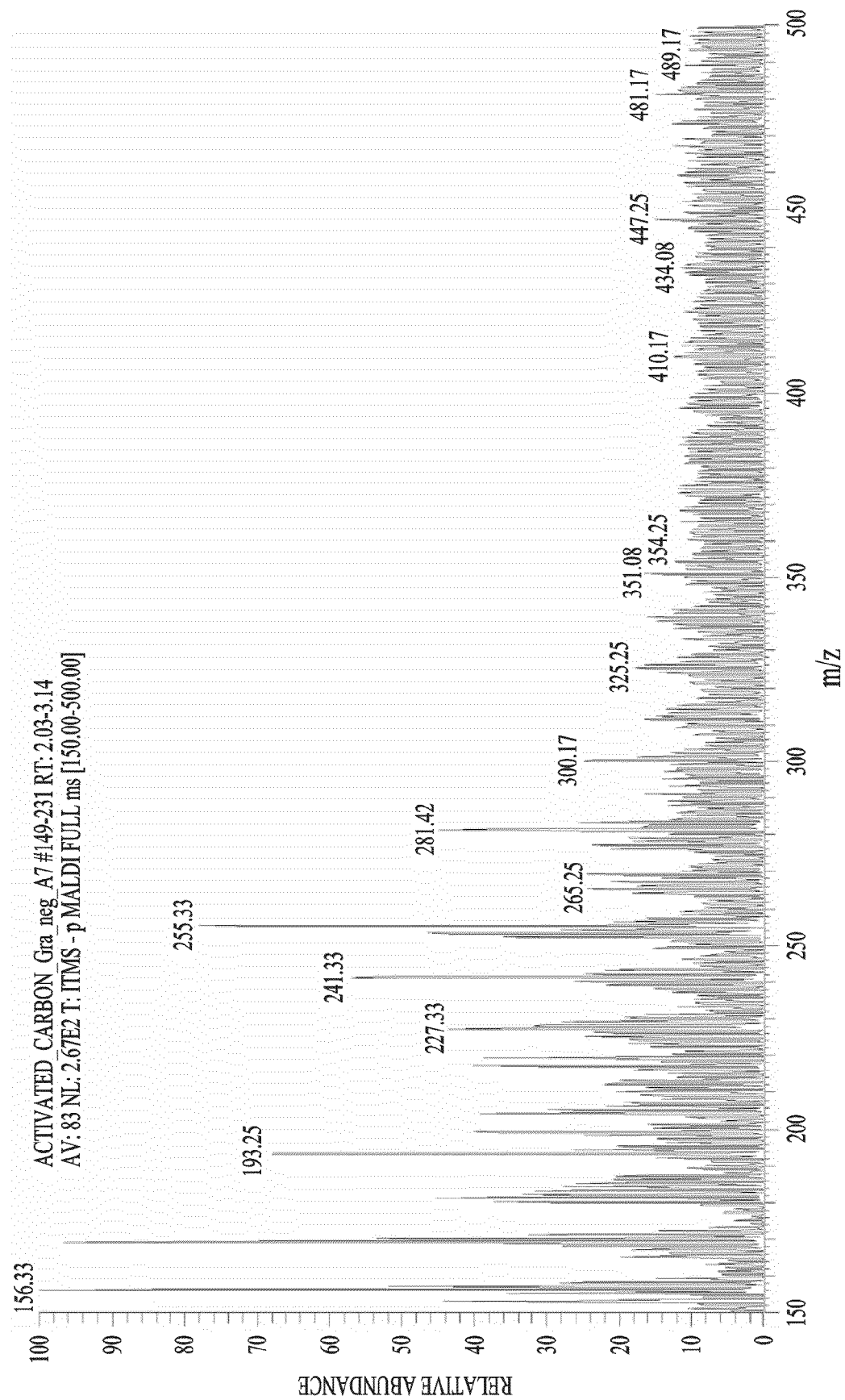
FIG. 18 illustrates MALDI-Mass Spectrometry profiles of microalgae oils from *Neochloris* converted to methyl esters using activated carbon as the matrix, illustrating the poor signal-to-noise ratio of activated carbon (cf.

MCN material is therefore capable of adsorbing several short chain fatty acids selectively, due to their specific surface properties. Results from an MCN MALDI-MS matrix were compared to those using activated carbon as a matrix. The mesoporous carbon nanomaterial (MCN) was found to be a more efficient material to use as a matrix. FIGS. 17 and 18 show that the signal-to-noise ratio of the MALDI-MS spectra for activated carbon as a matrix is too low to determine which FFAs and what quantities were sequestered by the activated carbon. Accordingly, the MCN material provides a significant advancement in the filed of FFA sequestration and analysis.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A mesoporous particle comprising an ordered porous silicon oxide matrix with hexagonal symmetry, (C10-C20) alkyl groups covalently bonded to the outside surface of the mesoporous particle, and amino(C1-C12)alkyl chain groups covalently bonded to the inner surfaces of pores of the mesoporous particle, wherein the pores of the particle have two different average size distributions of about 3 nm to about 5 nm and about 13 nm to about 15 nm, and optionally wherein the alkyl chain of the amino(C1-C12)alkyl group is interrupted by one or two —NH— groups.

2. A method to selectively sequester free fatty acids from microorganisms that produce free fatty acids, comprising contacting the microorganisms with a plurality of particles of claim 1, wherein the free fatty acids selectively adsorb to or are absorbed by the pores or surface of the particles, and wherein less than 20 wt. % of the compounds adsorbed or absorbed by the particles are compounds other than free fatty acids, thereby selectively sequestering the free fatty acids.

3. The method of claim 2 further comprising separating the particles and the adsorbed or absorbed free fatty acids from the microorganisms.

4. The method of claim 3 further comprising contacting the particles and the adsorbed or absorbed free fatty acids with a ($C_1$-$C_4$)alcohol and an acid, thereby esterifying the free fatty acids to provide the corresponding ($C_1$-$C_4$)alkyl esters.

5. A method of selectively extracting organic compounds from a microorganism, wherein the organic compounds comprise mono-, di-, or triglycerides, fatty acids, polar lipids, or a combination thereof, comprising:

a) contacting a microorganism in a medium comprising water, with a hydrophobic organic solvent, to form a first mixture;
b) contacting the first mixture with a plurality of mesoporous particles of claim 1, to form a second mixture in which the mesoporous particles sequester the organic compounds from the microorganism;
c) isolating the mesoporous particles from the second mixture; and
d) removing the organic compounds from the mesoporous particles to provide a group of selectively extracted organic compounds.

6. The method of claim 5 wherein removing the organic compounds from the mesoporous particles comprises washing the mesoporous particles with a hydrophobic organic solvent, optionally further comprising evaporating the hydrophobic organic solvent.

7. The method of claim 5 wherein the group of selectively extracted organic compounds is substantially free of chlorophyll, sterols, tocopherols, terpenes, or a combination thereof.

8. The method of claim 5, wherein the organic compounds comprise C16 and C18 organic acids, and wherein a higher wt. % of C18 acids is extracted from the microorganism, compared to the wt. % of C16 acids.

9. The method of claim 8 wherein the C18 acids comprise one or more of stearic acid, oleic acid, or linoleic acid.

10. The method of claim 5, wherein the organic compounds comprise C16 and C18 organic acids, and wherein a higher wt. % of C16 acids is extracted from the microorganism, compared to the wt. % of C18 acids.

11. The method of claim 10 wherein the C16 acids comprise one or more of palmitic acid or palmitoleic acid.

12. The method of claim 5, wherein the microorganism is an alga.

13. The method of claim 12, wherein the alga is a wild type alga.

14. The method of claim 12, wherein the alga is a genetically modified alga.

15. The method of claim 12, wherein the genus of the alga is *Botryococcus, Chlorella, Neochloris, or Nannochloropsis*, and optionally wherein the alga is genetically modified.

16. The method of claim 12, wherein the alga is wild-type or genetically modified, and wherein the oil content of the alga comprises about 15 wt. % dry weight to about 75 wt. % dry weight.

17. The method of claim 5 wherein the hydrophobic organic solvent comprises hexane.

18. The method of claim 5 wherein the second mixture is heated prior to isolating the mesoporous particles from the second mixture.

19. The method of claim 5, wherein performing the method does not kill the microorganism.

* * * * *